United States Patent
Lin et al.

(10) Patent No.: US 9,342,529 B2
(45) Date of Patent: May 17, 2016

(54) DIRECTORY-LEVEL REFERRAL METHOD FOR PARALLEL NFS WITH MULTIPLE METADATA SERVERS

(71) Applicant: HITACHI, LTD., Tokyo (JP)

(72) Inventors: Wujuan Lin, Singapore (SG); Kaushik Mysur, Singapore (SG); Hirokazu Ikeda, Singapore (SG); Kenta Shiga, Kanagawa-Ken (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 13/729,256

(22) Filed: Dec. 28, 2012

(65) Prior Publication Data

US 2014/0188953 A1 Jul. 3, 2014

(51) Int. Cl.
*G06F 17/30* (2006.01)

(52) U.S. Cl.
CPC .................. *G06F 17/30203* (2013.01)

(58) Field of Classification Search
None
See application file for complete search history.

(56) References Cited

U.S. PATENT DOCUMENTS

| | | | |
|---|---|---|---|
| 7,389,298 B2 | 6/2008 | Brown et al. | |
| 7,509,645 B2 | 3/2009 | Coates et al. | |
| 7,987,161 B2 | 7/2011 | Williams et al. | |
| 2006/0161518 A1* | 7/2006 | Lacapra | 707/2 |
| 2009/0106255 A1* | 4/2009 | Lacapra et al. | 707/10 |
| 2011/0153606 A1 | 6/2011 | Kim et al. | |
| 2011/0238814 A1* | 9/2011 | Pitts | G06F 17/30067 709/223 |
| 2012/0072540 A1* | 3/2012 | Matsuzawa | H04L 67/1097 709/219 |
| 2012/0284317 A1* | 11/2012 | Dalton | G06F 17/301 707/827 |
| 2013/0290384 A1* | 10/2013 | Anderson | G06F 17/30091 707/822 |

* cited by examiner

*Primary Examiner* — Bai D. Vu
(74) *Attorney, Agent, or Firm* — Mattingly & Malur, PC

(57) ABSTRACT

An aspect of the invention is directed to a plurality of MDSs (metadata servers) in a distributed storage system which includes data servers storing file contents, each MDS having a processor and a memory and storing file system metadata. Directories of a file system namespace are distributed to the MDSs through referral directories referring to real directories using hash value of inode number of each of the referral directories. During a process to create a directory in the file system namespace, a first MDS dynamically creates a referral directory in the first MDS, and creates a real directory in a second MDS, the referral directory in the first MDS referring to the real directory in the second MDS by maintaining location information of the real directory in the second MDS, the real directory in the second MDS containing the file system metadata for the directory in the file system namespace.

20 Claims, 24 Drawing Sheets

Referral-to-Path Mapping Table

0277

| Hash Value | Local Path | IP Address |
|---|---|---|
| 0x10 | /dir1/dir2/dir3 | 192.168.2.20 |
| ... | ... | ... |

Workload Information Table

027A

| Local Path | Access Count |
|---|---|
| /dir1/dir2/dir3 | 0 |
| ... | ... |
| Total | 100 |

Referral Status Table

| FSID | ClientID | Status |
|------|----------|--------|
| 0x30 | 0x0011 | Normal |
| ... | ... | ... |

0278

1510 — FSID
1520 — ClientID
1530 — Status

FIG. 15

DIRECTORY-LEVEL REFERRAL METHOD FOR PARALLEL NFS WITH MULTIPLE METADATA SERVERS

BACKGROUND OF THE INVENTION

The present invention relates generally to storage systems and, more particularly, to a directory-level referral method for parallel network file system with multiple metadata servers.

Recent technologies in distributed file system, such as parallel network file system (pNFS) and the like, enable an asymmetric system architecture, which consists of a plurality of data servers and a dedicated metadata server. In such a system, file contents are typically stored in the data servers, and metadata (e.g., file system namespace tree structure and location information of file contents) are stored in the metadata server. Clients first consult the metadata server for the location information of file contents, and then access file contents directly from the data servers. By separating the metadata access from data access, the system is able to provide very high I/O (Input/Output) throughput to the clients. One of the major use cases for such system is high performance computing (HPC) application.

Although metadata are relatively small in size compared to file contents, the metadata operations may make up as much as half of all file system operations, according to the studies done. Therefore, effective metadata management is critically important for the overall system performance. Modern HPC applications can use hundreds of thousands of CPU cores simultaneously for a single computation task. Each CPU core may steadily create/access files for various purposes, such as checkpoint files for failure recovery, intermediate computation results for post-processing (e.g., visualization, analysis, etc.), resulting in tremendous metadata access. A single metadata server is not sufficient to handle such metadata access workload. Transparently distributing such workload to multiple metadata servers and providing a single namespace to clients hence raises an important challenge for the system design. Traditional namespace virtualization methods fall into two categories, namely, server-only-virtualization and client-server-cooperation.

Server-only-virtualization methods can be further categorized into two sub-categories, namely, synchronization and redirection. In a synchronization method (U.S. Pat. No. 7,987,161), the entire namespace is duplicated to multiple metadata servers. Clients can access the namespace from any metadata servers. Any update to the namespace is synchronized to all the metadata servers. A synchronization method has limited scalability due to high overhead for namespace synchronization. In a redirection method (U.S. Pat. No. 7,509,645), the metadata servers maintain information about how the namespace is distributed. Once a client establishes connection with a metadata server, the client will always access the entire namespace through the same metadata server (called local server). When the client needs to access a namespace portion that is not stored in the local server, the local server redirects the access to another metadata server (called remote server) where the namespace portion is located. Once the local server receives the reply from the remote server, it will send the reply to the client. A redirection method has low overall system performance due to such access redirection overhead.

Client-server-cooperation methods can also be further categorized into two sub-categories, namely, distribution-aware and referral-based. In a distribution-aware method (U.S. Patent Application Publication No. 2011/0153606A1), each client has a distribution-aware module which maintains information about how the namespace is distributed, and is able to access a namespace portion from the metadata server where the namespace portion is located. However, a distribution-aware method requires a proprietary client and hence limits its use cases. In a referral-based method (U.S. Pat. No. 7,389,298), a client can seamlessly navigate a namespace across pre-created referral points with a single network mount. However, the referral points can only be created on exported file systems by a system administrator in advance. Workload balancing is coarse-grain and requires manual reconfiguration by the system administrator to relocate referral points. Hence, there is a need for a new namespace virtualization method to overcome the aforementioned shortcomings.

BRIEF SUMMARY OF THE INVENTION

Exemplary embodiments of the invention provide a method to distribute namespace to multiple metadata servers (MDSs) through referral directories without performance overhead on MDSs or proprietary client, and dynamically redistribute real directories referred to from referral directories for load balancing without manual reconfiguration. In specific embodiments, a distributed file system includes a plurality of MDSs, data servers (DSs), and Clients, where directories of a global file system namespace are distributed to the MDSs through the creation of referral directories. This invention can be used to design a parallel network file system to provide scalable high metadata access performance, by using multiple metadata servers.

An aspect of the present invention is directed to a plurality of MDSs (metadata servers) in a distributed storage system which includes data servers storing file contents, each MDS having a processor and a memory and storing file system metadata. Directories of a file system namespace are distributed to the MDSs through referral directories referring to real directories using hash value of inode number of each of the referral directories. During a process to create a directory in the file system namespace, a first MDS dynamically creates a referral directory in the first MDS, and creates a real directory in a second MDS, the referral directory in the first MDS referring to the real directory in the second MDS by maintaining location information of the real directory in the second MDS, the real directory in the second MDS containing the file system metadata for the directory in the file system namespace.

In some embodiments, the location information of the referral directory includes a hash value for the real directory and an IP address of the second MDS, and the second MDS maps the hash value for the real directory to a local directory path in a local namespace of the second MDS to the real directory. The first MDS has a parent directory and creates the referral directory under the parent directory to refer to the real directory in the second MDS. The first MDS constructs an inode for the referral directory which refers to the real directory, the inode for the referral directory including an inode number, a file system identifier, and a location entry which has an IP address of the second MDS in which the real directory is located and a hash value of the inode number.

In specific embodiments, each MDS includes a referral-to-path mapping table to store entries of a hash value of any real directory in the MDS, a corresponding local path where the real directory is stored in a local namespace of the MDS, and a corresponding IP address of a source MDS where the referral directory referring to the real directory is located. Each MDS maintains workload information to monitor access workload for each directory in the referral-to-path mapping table of the MDS. The first MDS in the distributed storage system periodically collects utilization information from one or more of other MDSs and broadcasts consolidated utilization information to all the other MDSs.

In some embodiments, any MDS, which has a real directory being referred to from a referral directory and has utilization higher than a preset threshold, migrates the real directory including sub-tree of the real directory to another MDS which has utilization sufficiently low to receive migration of the real directory with the sub-tree, and informs a source MDS where the referral directory referring to the real directory is located of the updated location information. Each MDS includes a referral-to-path mapping table to store entries of a hash value of any real directory in the MDS, a corresponding local path where the real directory is stored in a local namespace of the MDS, and a corresponding IP address of a source MDS where the referral directory referring to the real directory is located. After migration of a real directory from one MDS to another MDS, the one MDS and said another MDS update respective referral-to-path mapping tables and update respective workload information for the respective MDSs based on the migration. If the sub-tree of the real directory to be migrated includes another real directory being referred to from another referral directory, the said another real directory is not migrated but remains in the same MDS before migration of the sub-tree.

In specific embodiments, each directory in the MDSs has an inode, the inode including an inode number, a mode of "referral" for a referral directory and "normal" for a directory which is not a referral directory, a file system identifier, and a location entry; the file system identifier uniquely identifies the referral directory if the mode is referral; and the location entry has an IP address of the MDS in which the real directory is located and a hash value of the inode number if the mode is referral. The inode of a directory further includes a count which is a number of MDSs to which sub-directories of the directory can be distributed, and a MDS-List which is a list of IP addresses of MDSs to which the sub-directories can be distributed; and the count and MDS-List are determined based on depth and width of the directory.

Another aspect of the invention is directed to a method of managing directories in a distributed storage system which includes a plurality of MDSs (metadata servers) storing file system metadata and data servers storing file contents. The method comprises distributing directories of a file system namespace to the MDSs through referral directories referring to real directories using hash value of inode number of each of the referral directories. During a process to create a directory in the file system namespace, a first MDS dynamically creates a referral directory in the first MDS, and creates a real directory in a second MDS, the referral directory in the first MDS referring to the real directory in the second MDS by maintaining location information of the real directory in the second MDS, the real directory in the second MDS containing the file system metadata for the directory in the file system namespace.

In some embodiments, the location information of the referral directory includes a hash value for the real directory and an IP address of the second MDS, and the method further comprises mapping, by the second MDS, the hash value for the real directory to a local directory path in a local namespace of the second MDS to the real directory. The first MDS has a parent directory and creates the referral directory under the parent directory to refer to the real directory in the second MDS, and the method further comprises constructing, by the first MDS, an inode for the referral directory which refers to the real directory, the inode for the referral directory including an inode number, a file system identifier, and a location entry which has an IP address of the second MDS in which the real directory is located and a hash value of the inode number.

These and other features and advantages of the present invention will become apparent to those of ordinary skill in the art in view of the following detailed description of the specific embodiments.

BRIEF DESCRIPTION OF THE DRAWINGS

FIG. 11 shows an example of the structure of a referral-to-path mapping table.

FIG. 12 shows an example of the structure of a workload information table.

FIG. 15 shows an example of the structure of a referral status table.

DETAILED DESCRIPTION OF THE INVENTION

Figure 1:
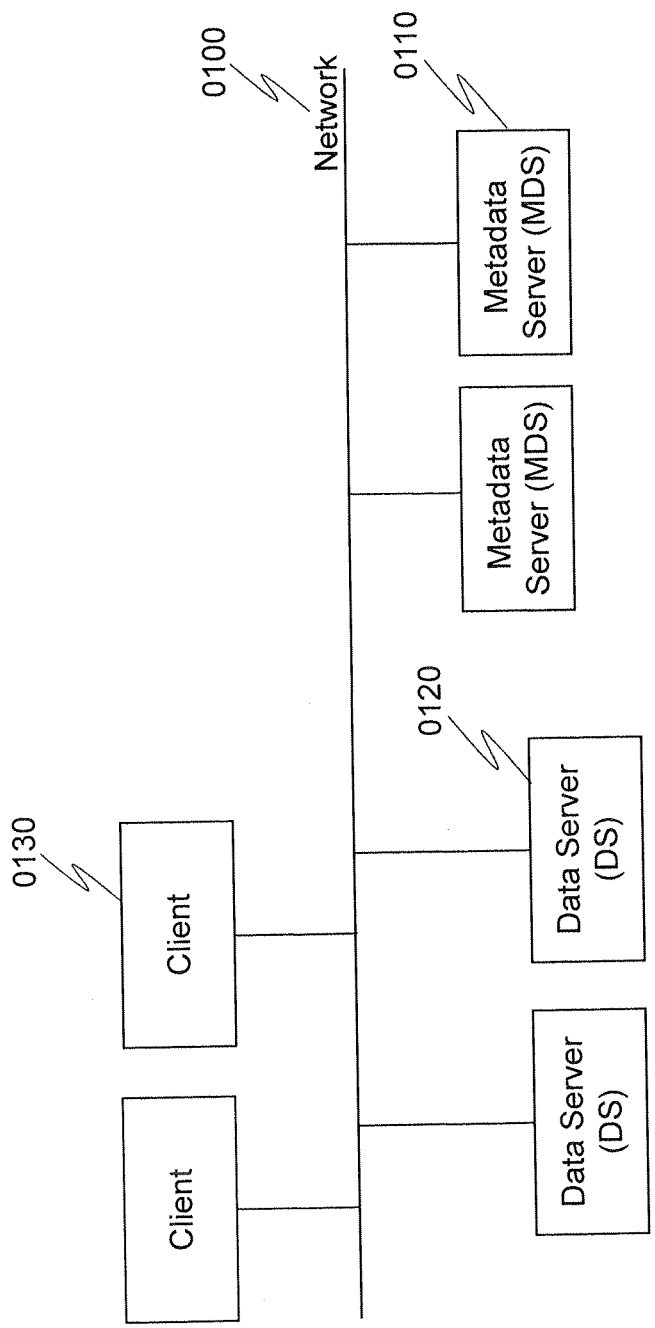
FIG. 1 is an exemplary diagram of an overall system in which the method and apparatus of the invention may be applied according to a first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention; and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a directory-level referral process for parallel network file system with multiple metadata servers.

Embodiment 1

FIG. 1 is an exemplary diagram of an overall system in which the method and apparatus of the invention may be applied according to a first embodiment. The system includes a plurality of Metadata Servers (MDSs) 0110, Data Servers (DSs) 0120, and Clients 0130 connected to a network 0100 (such as local area network). MDSs 0110 are the devices where the file system metadata (e.g., directory structure and location information of file contents) are stored. Data servers 0120 are the devices, such as conventional NAS (network attached storage) devices, where file contents are stored. Clients 0130 are the devices (such as PCs) that access the metadata from MDSs 0110 and the file contents from DSs 0120.

Figure 2:
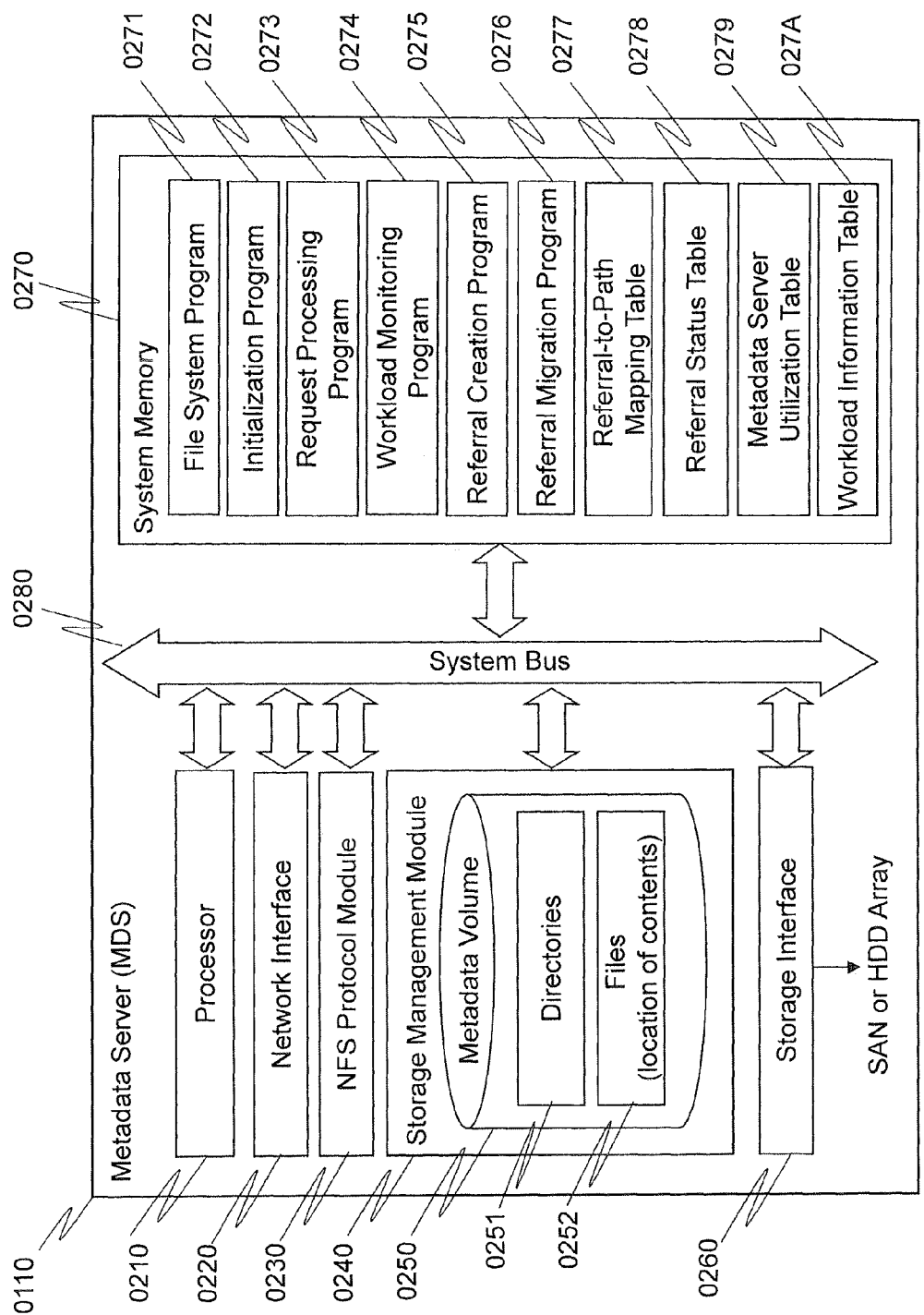
FIG. 2 is a block diagram illustrating an example of the components within a MDS.

FIG. 2 is a block diagram illustrating an example of the components within a MDS 0110. A MDS may include, but is not limited to, a processor 0210, a network interface 0220, a NFS (network file system, e.g., NFSv4.1 or above) protocol module 0230, a storage management module 0240, a storage interface 0260, a system memory 0270, and a system bus 0280. The system memory 0270 includes, but is not limited to, a file system program 0271, an initialization program 0272 (see FIG. 5), a request processing program 0273 (see FIG. 7), a workload monitoring program 0274 (see FIG. 18), a referral creation program 0275 (see FIG. 10), and a referral migration program 0276 (see FIG. 19), which are computer programs executed by the processor 0210. The system memory 0270 further includes a referral-to-path mapping table 0277 (see FIG. 11), a referral status table 0278 (see FIG. 15), a metadata server utilization table 0279 (see FIG. 6), and a workload information table 027A (see FIG. 12), which are read and/or written by the programs. The storage interface 0260 manages the storage from a storage area network (SAN) or an internal hard disk drive (HDD) array, and provides raw data storage to the storage management module 0240. The storage management module 0240 organizes the raw data storage into a metadata volume 0250, where directories 0251, and files 0252 which consist of only file contents location information, are stored. The directories 0251 and files 0252 are read and/or written by the file system program 0271. The network interface 0220 connects the MDS 0110 to the network 0100 and is used to communicate with other MDSs 0110, DSs 0120, and Clients 0130. The NFS protocol module 0230 implements both client and server functions of the NFS protocol to send NFS requests to Data Servers 0120 and serve metadata access requests from Clients 0130 through the network interface 0220. The processor 0210 represents a central processing unit that executes the computer programs. Commands and data communicated among the processor and other components are transferred via the system bus 0280.

Figure 3:
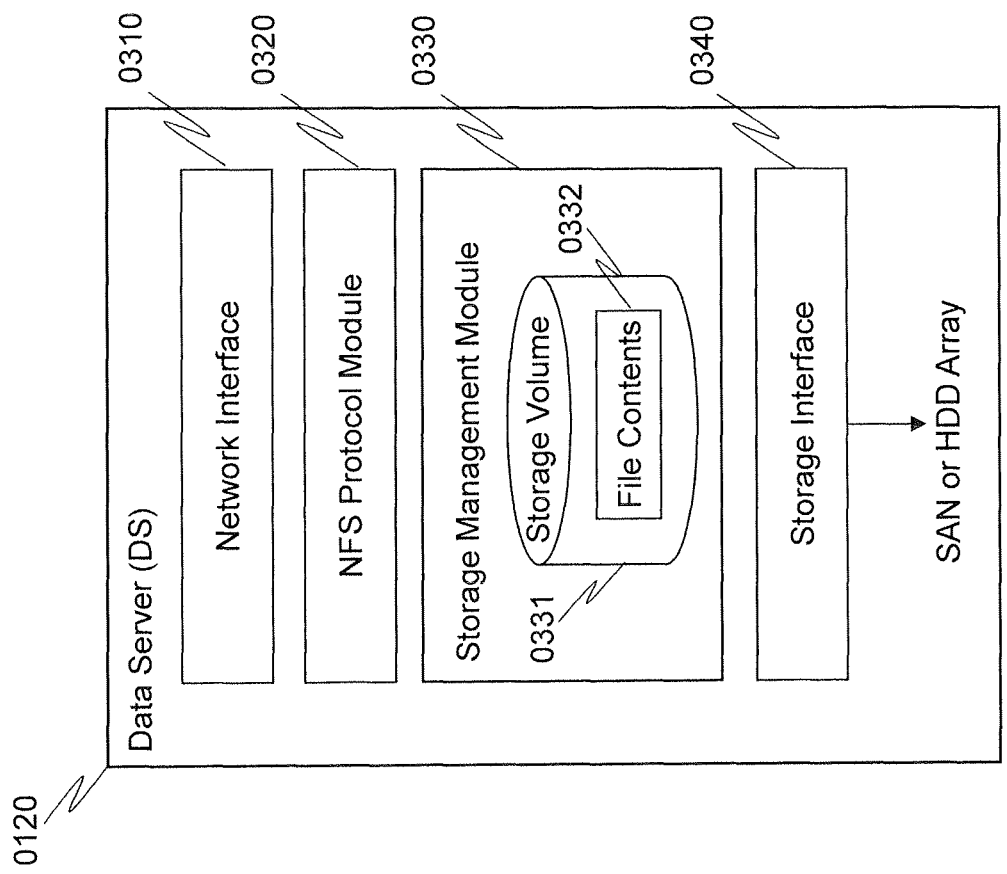
FIG. 3 is a block diagram illustrating the components within a DS (Data Server).

FIG. 3 is a block diagram illustrating the components within a DS 0120. A DS may include, but is not limited to, a network interface 0310, a NFS protocol module 0320, a storage management module 0330, and a storage interface 0340. The network interface 0310 connects the DS 0120 to the network 0100 and is used for communication with MDS 0110 and Clients 0130. The NFS protocol module 0320 implements the server functions of NFS protocol, and serves NFS requests from MDS 0110 and Clients 0130. The storage interface 0340 manages the storage from a storage area network (SAN) or an internal hard disk drive (HDD) array, and provides raw data storage to the storage management module 0330. The storage management module 0330 organizes the raw data storage into a storage volume 0331, where file contents 0332 are stored.

Figure 4:
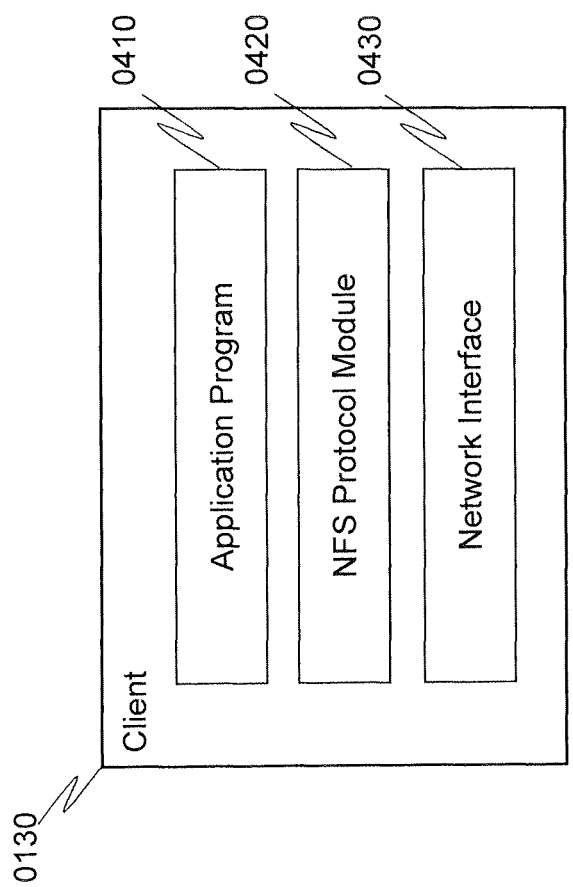
FIG. 4 is an example of a block diagram illustrating the components within a client.

FIG. 4 is an example of a block diagram illustrating the components within a client 0130. A Client may include, but is not limited to, an application program 0410, a NFS protocol module 0420, and a network interface 0430. The application program 0410 generates metadata accesses to the namespace and read/write operations on file contents. The network interface 0430 connects the Client 0130 to the network 0100 and is used to communicate with MDSs 0110 and DSs 0120. The NFS protocol module 0420 implements client functions of the NFS protocol to send metadata access requests to MDSs 0110 and file content access requests to DSs 0120.

Figure 16:
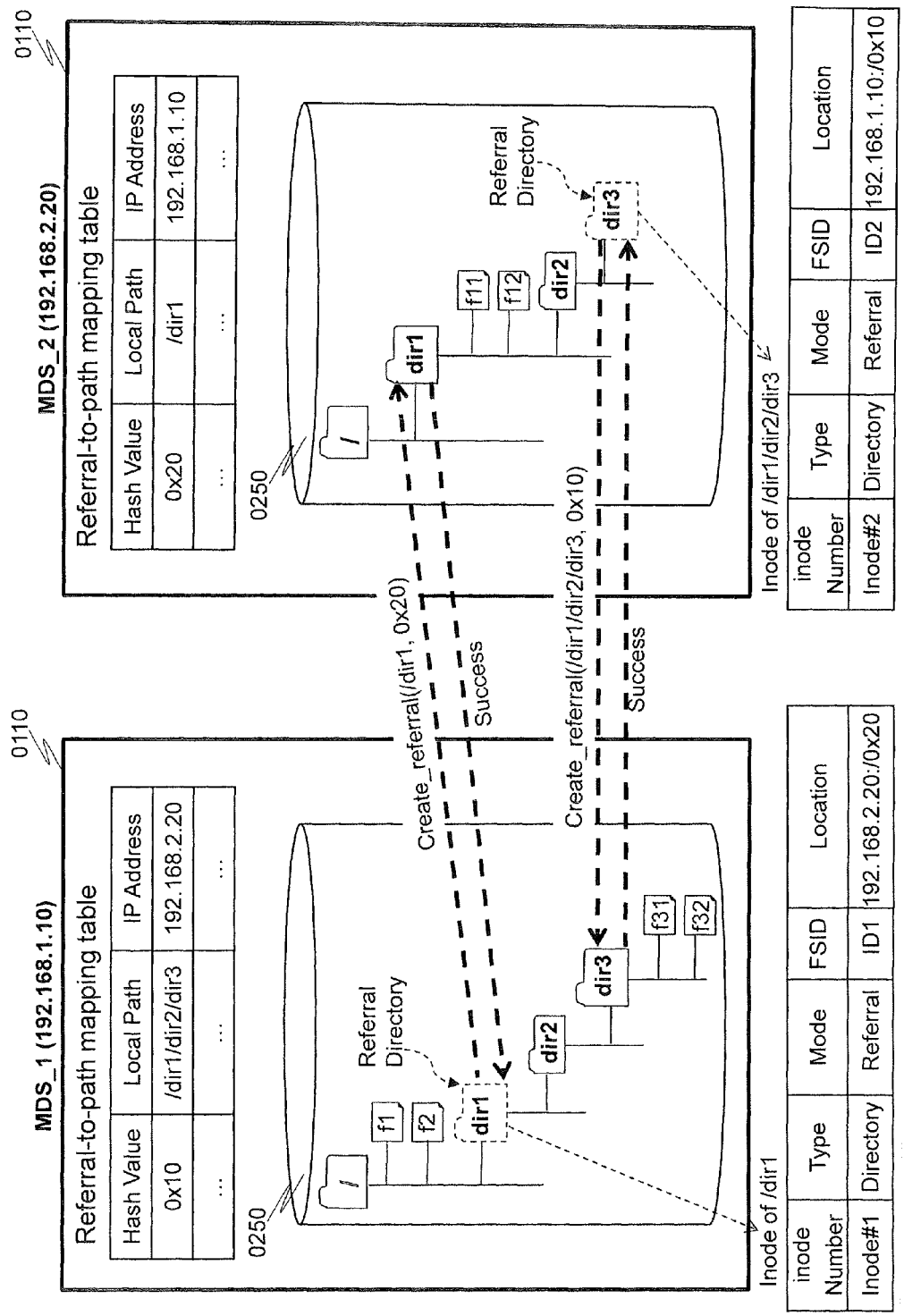
FIG. 16 shows an example illustrating a file system namespace which is distributed to two MDSs.

Before describing the processes of the various programs of the MDS, an overview using a file system namespace of FIG. 16 is instructive. FIG. 1 shows a distributed file system includes a plurality of MDSs 0110, DSs 0120, and Clients 0130. Directories of a global file system namespace are distributed to the MDSs through the creation of referral directories. In the example shown in FIG. 16, during the creation of directories in response to a client (e.g., Client_1), a file system namespace is distributed to two MDSs 0110, namely, MDS_1 (with IP address 192.168.1.10) and MDS_2 (with IP address 192.168.2.20). As seen in FIG. 16, "/dir1" is a referral directory created by MDS_1 and the real directory is stored in MDS_2. MDS_1 constructs the inode of "/dir1" having FSID of ID1 and Location (IP:/hash_value) of 192.168.2.20:/0x20, and performs Create_referral(/dir1, 0x20) to refer to the real directory in MDS_2. MDS_2 updates the referral-to-path mapping table 0277 for "/dir1" with hash value 0x20, and returns "success" to MDS_1, which returns "success" to its client. To access the real directory "/dir1" by referral (e.g., by Client_2), Client_2 will try to access "/dir1" in MDS_1 and MDS_1 will inform Client_2 that it has a referral directory for "/dir1" and provide the FSID and Location (IP:/hash_value) information of the real directory to Client_2. Client_2 will access MDS_2 based on the Location (IP:/hash_value) information. MDS_2 will send a reply to Client_2 with metadata of "/dir1."

Note that the term "real directory" is used to refer to a directory that is referred to from a referral directory. It is not intended to imply that a referral directory is somehow not real. The real directory corresponds to the referral directory and contains the file system metadata. When a client tries to access the file system metadata, the referral directory refers to client to the real directory to access the file system metadata stored in the real directory.

Figure 5:
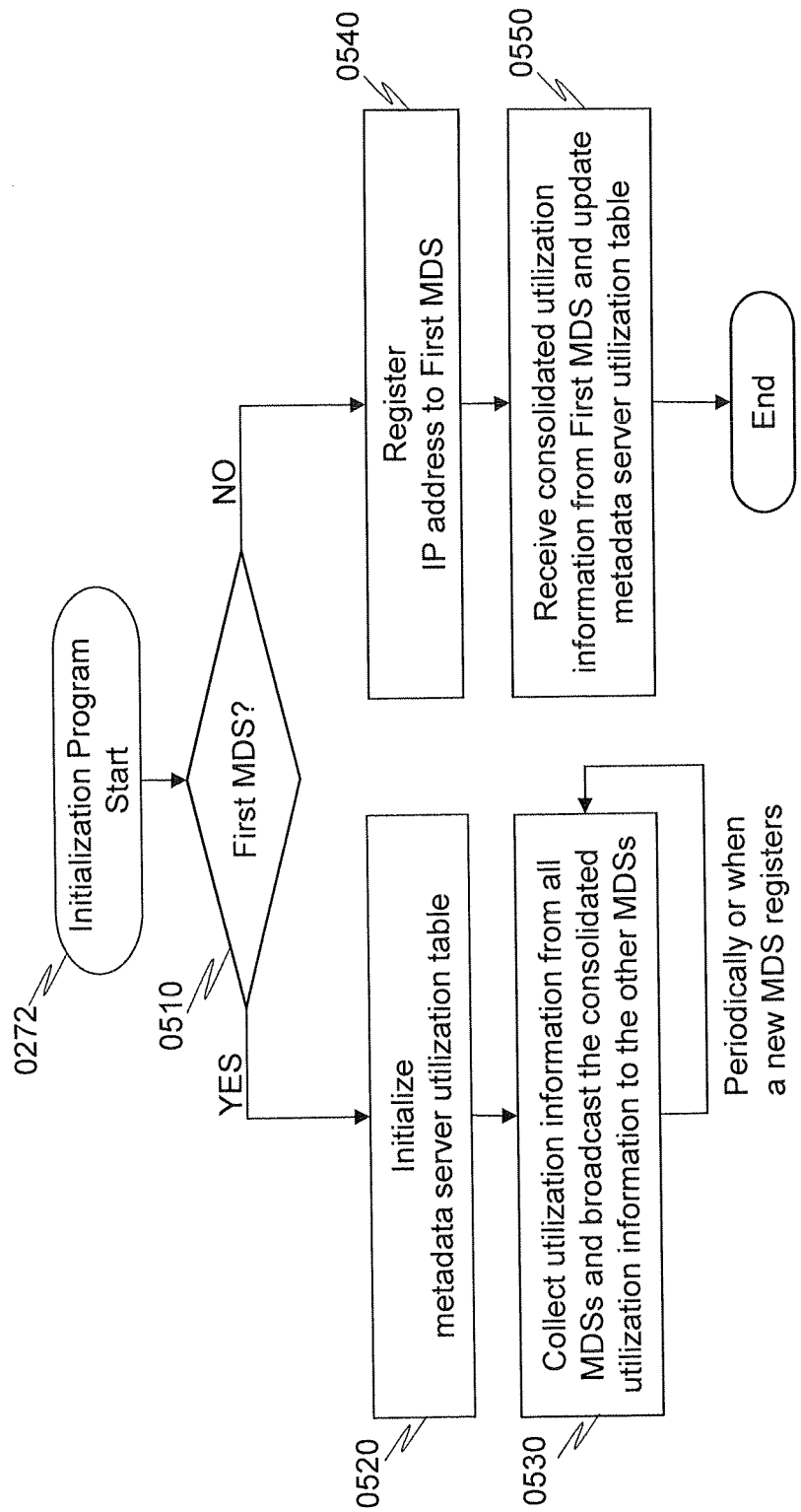
FIG. 5 is an example of a flow diagram illustrating the exemplary steps to start a MDS, by executing an initialization program.

FIG. 5 is an example of a flow diagram illustrating the exemplary steps to start a MDS 0110, by executing an initialization program 0272. In Step 0510, the MDS checks if it is the first MDS (for example, by checking if its IP address is a preconfigured IP address). If YES, in Step 0520, the MDS initializes the metadata server utilization table 0279, by inserting an entry with its IP address and utilization as 0%.

Figure 6:
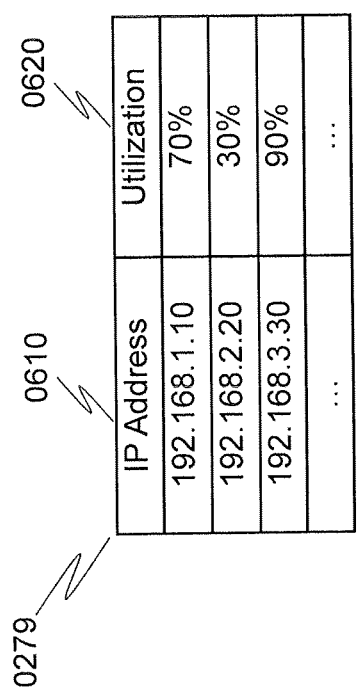
FIG. 6 shows an example of the structure of a metadata server utilization table.

FIG. 6 shows an example of the structure of a metadata server utilization table 0279, which consists of, but is not limited to, two columns, including IP address 0610 and utilization 0620. Utilization 0620 is a percentage number representing the resource (e.g., CPU, storage, network bandwidth, or the combination) utilization percentage of a MDS 0110.

Referring back to FIG. 5, if NO in Step 0510, in Step 0540, the MDS 0110 registers its IP address to the first MDS. Upon receiving the registration message, the first MDS inserts an entry into the metadata server utilization table with the received IP address and utilization as 0%. In Step 0530, the first MDS, periodically or when a new MDS 0110 registers, collects utilization information from all the MDSs 0110 and broadcasts the consolidated utilization information to the other MDSs. Upon receiving the broadcast message from the first MDS, in Step 0550, the MDS 0110 updates the metadata server utilization table 0279 with the consolidated utilization information. As a result, the metadata server utilization table 0279 in each MDS 0110 maintains the utilization information of all the MDSs 0110 and is periodically updated by the first MDS.

Figure 7:
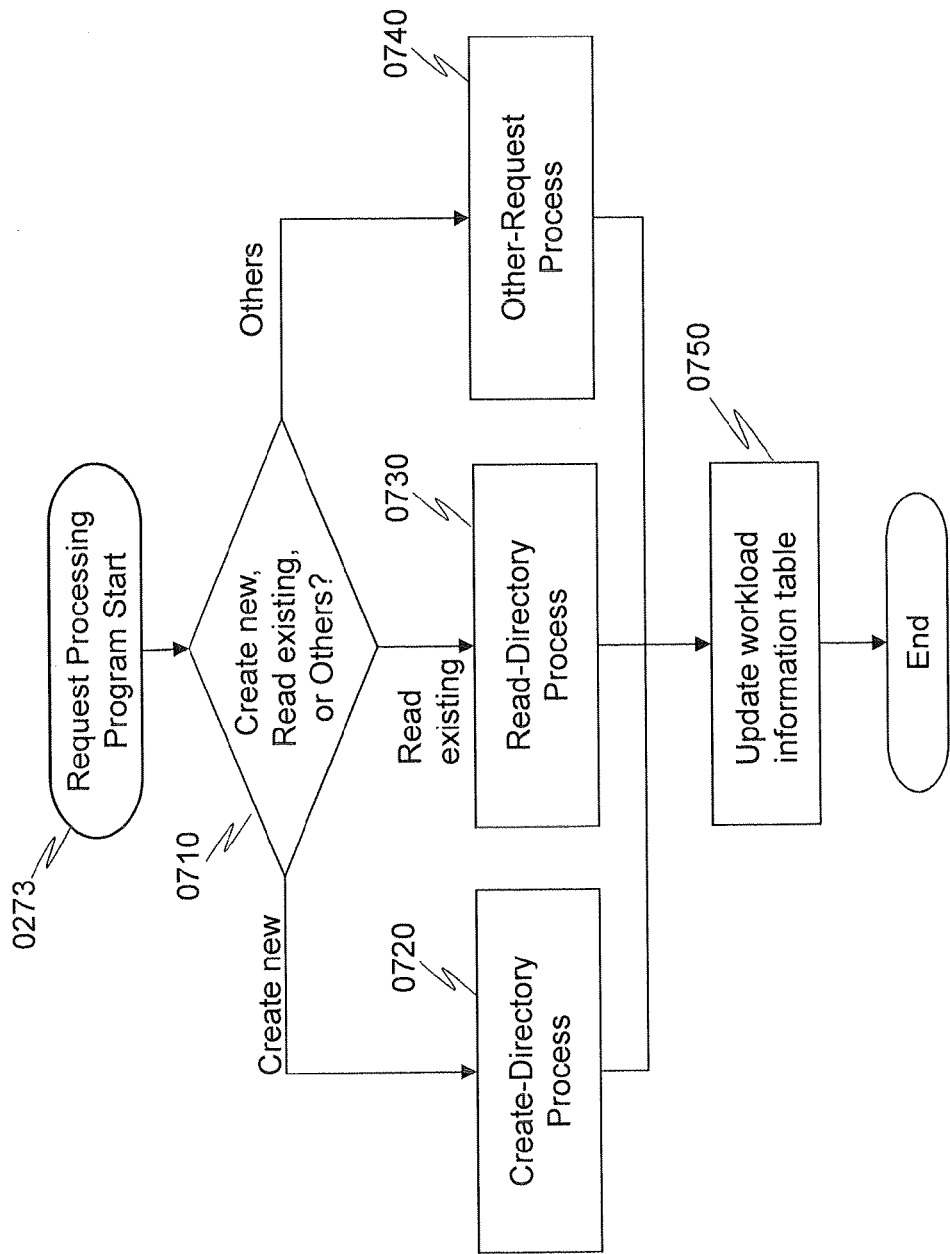
FIG. 7 is an example of a flow diagram illustrating the exemplary steps to process client requests in a MDS, by executing a request processing program.

FIG. 7 is an example of a flow diagram illustrating the exemplary steps to process client requests in a MDS 0110, by executing a request processing program 0273, after the MDS starts as aforementioned. It may be noted that the root directory "/" of the namespace is created by the first MDS (once start) and stored in the first MDS, which is known to all the Clients 0130. In Step 0710, the current MDS checks if the request is to create a new directory, or read an existing directory, or others. If the request is to create a new directory, in Step 0720, the current MDS executes a create-directory process (see FIG. 8). If the request is to read an existing directory, in Step 0730, the current MDS then executes a read-directory process (see FIG. 14). If the request is of some other type (for "others"), in Step 0740, the current MDS then serves the request as conventional NFS protocol except SEQUENCE RPC call (see FIG. 21). In Step 0750, the current MDS updates its workload information table 027A (see FIG. 17).

Figure 8:
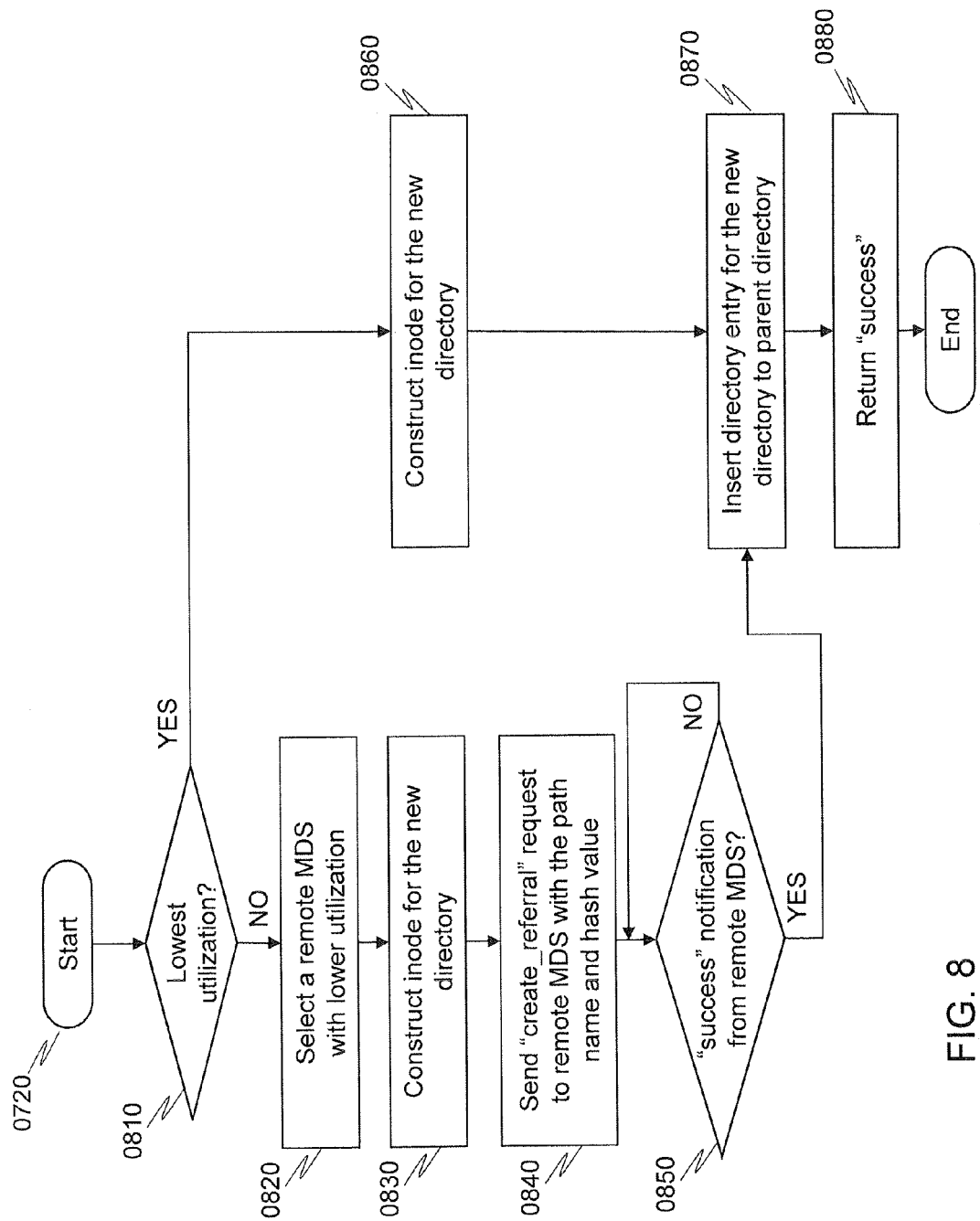
FIG. 8 is an example of a flow diagram illustrating the exemplary steps of the create-directory process according to the first embodiment.

FIG. 8 is an example of a flow diagram illustrating the exemplary steps of the create-directory process (Step 0720 in FIG. 7) according to the first embodiment. In Step 0810, the current MDS checks if it has the lowest utilization in the metadata server utilization table 0279. If NO, in Step 0820, the current MDS selects another MDS (referred to as remote MDS) which has lower utilization (randomly or select the one with the lowest utilization). In Step 0830, the current MDS constructs an inode for the new directory, by assigning an inode number and a FSID, and setting type as "Directory," mode as "referral," and location as "IP address of remote MDS:/hash value of inode number."

Figure 9:
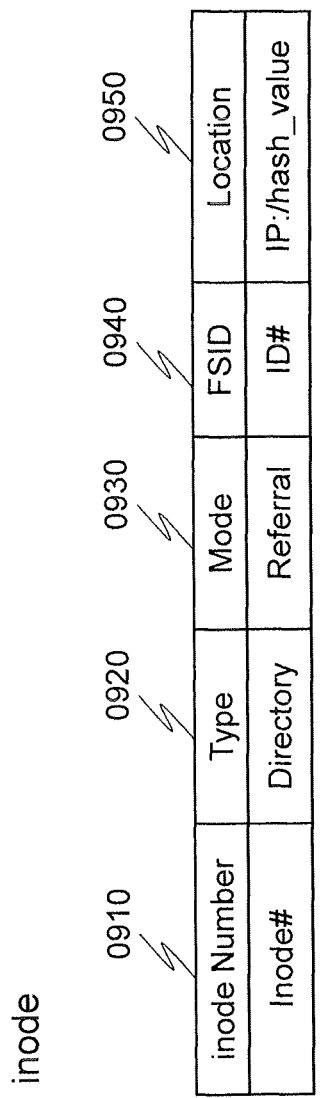
FIG. 9 shows an example of the structure of an inode according to the first embodiment.

FIG. 9 shows an example of the structure of an inode according to the first embodiment. An inode consists of, but is not limited to, 5 elements, including inode number 0910, type 0920, mode 0930, FSID 0940, and location 0950. The inode number 0910 is a unique identifier assigned to a file/directory. The type 0920 is either "File" or "Directory." The mode 0930 is either "referral" or "normal" for a directory, and is always "normal" for a file. The FSID 0940 is a unique file system identifier. The location 0950 consists of IP address:/hash_value. The hash_value is obtained from the hash value of the inode number, and is unique with a collision-free hash function, such as 160-bit SHA-1 or the like. The FSID 0940 and location 0950 are set to empty for an inode with mode 0930 as "normal."

Referring back to FIG. 8, in Step 0840, the current MDS sends a "create_referral" request to the remote MDS. The request consists of the full path of the directory to be created in the namespace, and the hash_value. In Step 0850, the current MDS waits to receive "success" notification from the remote MDS.

Figure 10:
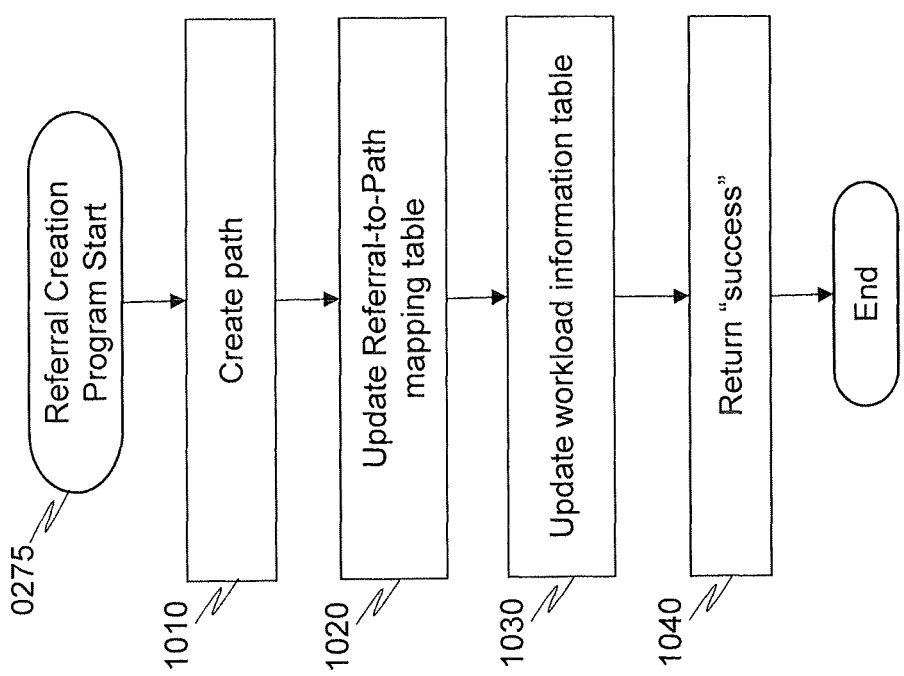
FIG. 10 is an example of a flow diagram illustrating the exemplary steps of a referral creation program executed by the remote MDS.

FIG. 10 is an example of a flow diagram illustrating the exemplary steps of a referral creation program 0275 executed by the remote MDS, upon receiving the "create_referral" request. In Step 1010, the remote MDS creates the directories in the received path, if the directories did not exist. For example, if the received path is "/dir1/dir2/dir3," the remote MDS will create "/dir1," "/dir1/dir2," and "/dir1/dir2/dir3" in sequence. In Step 1020, the remote MDS updates its referral-to-path mapping table 0277, by inserting an entry with the received hash value, path, and the IP address of the MDS 0110 which sends the "create_referral" request.

FIG. 11 shows an example of the structure of a referral-to-path mapping table 0277, which consists of, but is not limited to, 3 columns, including a hash value 1110, a local path 1120, and an IP address 1130. The hash value 1110 is a hash value of the inode number 0910 of a referral directory. The local path 1120 is the path where the real directory of the referral directory is stored. The IP address 1130 is the IP address of a MDS 0110 (referred to as source MDS) where the referral directory is created.

Referring back to FIG. 10, in Step 1030, the remote MDS updates its workload information table 027A, by inserting an entry with the received path, and "0" access count.

FIG. 12 shows an example of the structure of a workload information table 027A, which consists of, but is not limited to, 2 columns, including a local path 1210, and an access count 1220. The local path 1210 is the path where the real directory of a referral directory is stored. The access count 1220 is the number of access to the sub-tree under the local path 1210. Initially, the access count 1220 is set to "0." Further, in the workload information table 027A, there is always an entry with local path 1210 as "Total," and access account 1220 is the summary of access account of all the other entries in the table.

Referring back to FIG. 10, in Step 1040, the remote MDS returns "success" to the MDS 0110 which sends the "create_referral" request.

Referring back to FIG. 8, after receiving the "success" notification from the remote MDS, in Step 0870, the current MDS inserts a directory entry for the new directory to its parent directory. As such, a referral directory is successfully created. In Step 0880, the current MDS returns "success" to the client 0130 which sends the create directory request. The referral directory (FIG. 10) is created dynamically, i.e., during the create directory process (FIG. 8), to distribute namespace workload to multiple metadata servers (MDSs).

Figure 13:
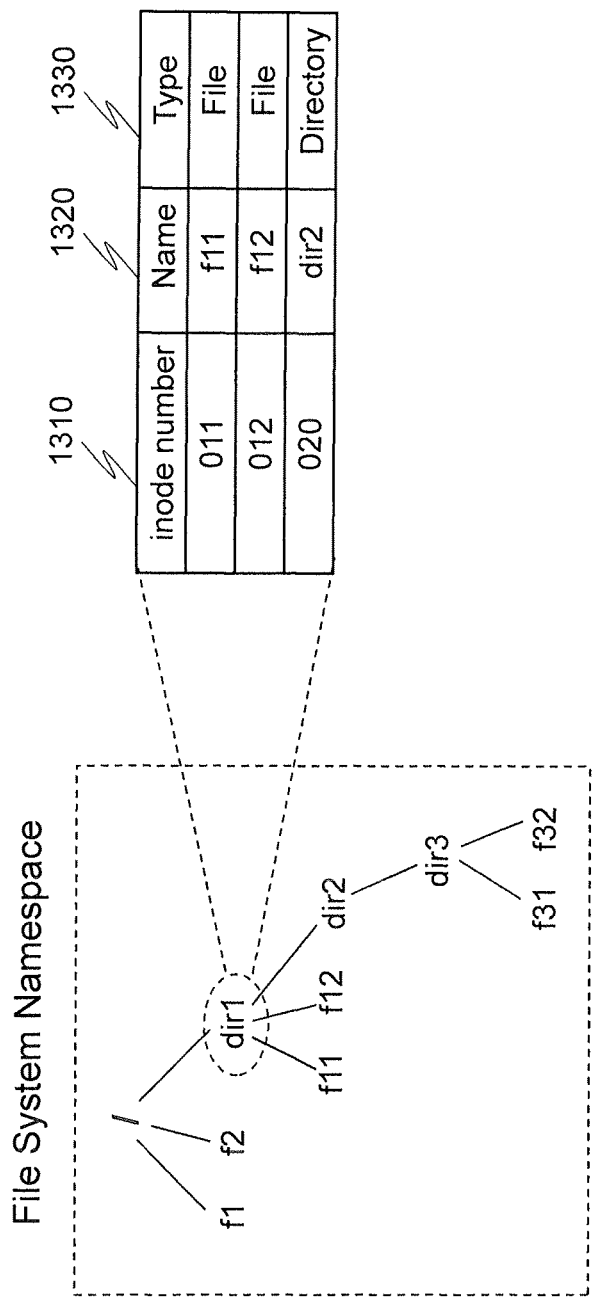
FIG. 13 shows an example of a file system namespace hierarchy.

FIG. 13 shows an example of a file system namespace hierarchy, which consists of 4 directories: "/," "/dir1," "/dir1/dir2," and "/dir1/dir2/dir3." Further, for each directory, the information of the sub-files and sub-directories under the directory is stored as the content of the directory, referred to as directory entries. FIG. 13 also shows an example of the structure of a directory entry, which consists of, but is not limited to, inode number 1310, name 1320, and type 1330. The inode number 1310 is a unique identifier assigned for the sub-file/sub-directory. The name 1320 is the sub-file/sub-directory name. The type 1330 is either "File" or "Directory."

Referring back to FIG. 8, if YES in Step 0810, in Step 0860, the current MDS constructs an inode for the new directory, by assigning an inode number 0910, and setting type 0920 as "Directory," mode 0930 as "normal," and FSID 0940 and location 0950 as empty. Similarly, the current MDS then executes Step 0870 and Step 0880.

Referring back to FIG. 7, in Step 0710, if the request is to read an existing directory, in Step 0730, the current MDS then executes a read-directory process.

Figure 14:
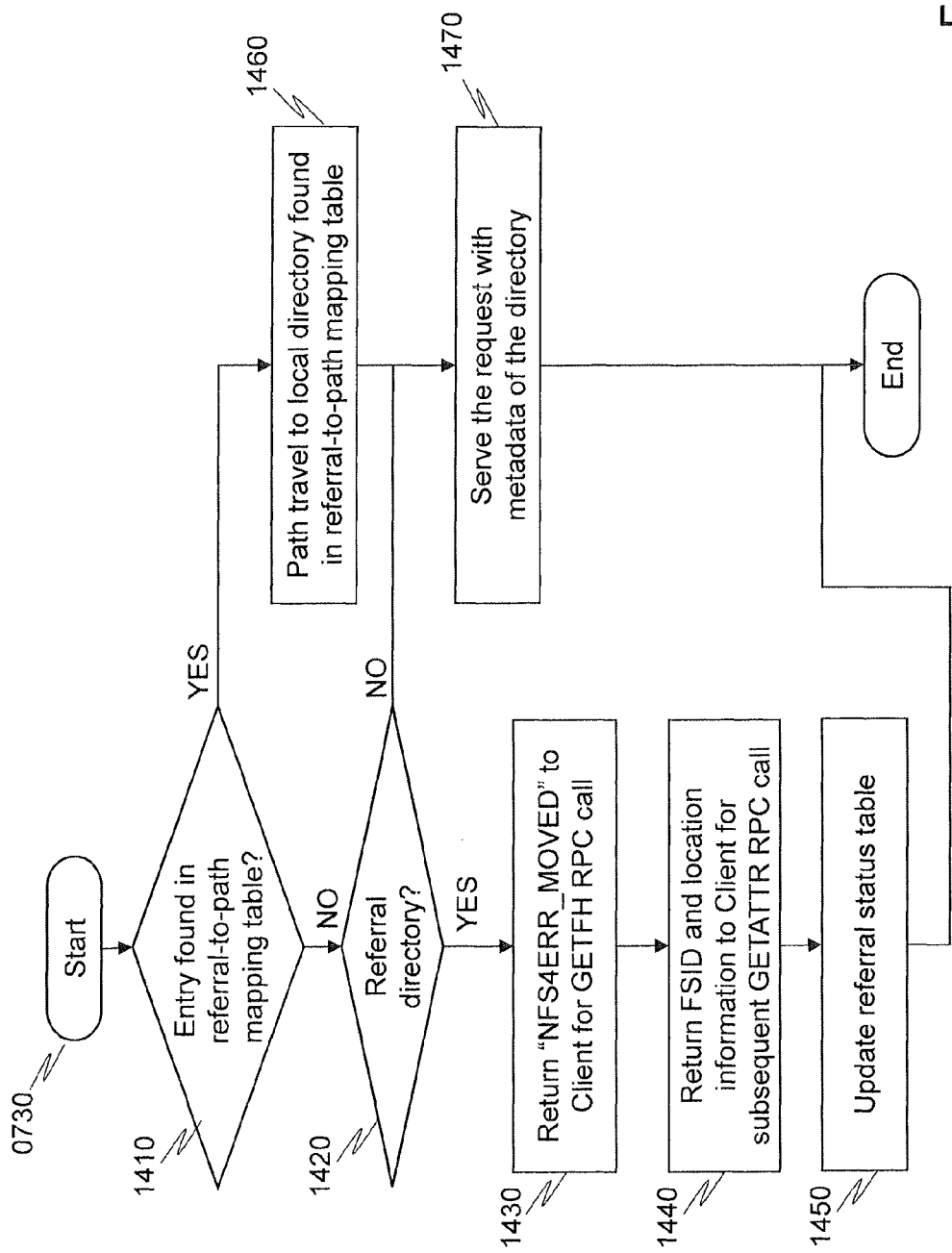
FIG. 14 is an example of a flow diagram illustrating the exemplary steps of the read-directory process.

FIG. 14 is an example of a flow diagram illustrating the exemplary steps of the read-directory process (Step 0730 in FIG. 7). In Step 1410, the current MDS checks if the requested directory is found in the referral-to-path mapping table 0277. If NO, in Step 1420, the current MDS further checks if the requested directory is a referral directory by checking the mode 0930 of the directory inode. If NO, in Step 1470, the current MDS simply serves the request with metadata of the directory. If YES in Step 1420, in Step 1430, the current MDS returns with information indicating that the requested directory is a referral directory (e.g., it may return "NFS4ERR_MOVED" for the GETFH, i.e., Get Current Filehandle, RPC call), and in Step 1440, returns the FSID 0940 and location 0950 of the directory inode for the subsequent GETATTR RPC call (to obtain attributes for the directory specified by the current filehandle), to the Client 0130 which sends the read directory request. Consequently, the Client will treat the referral directory as a mounted file system, and create a super block with the FSID 0940 and access the real directory from the remote MDS by using the location 0950 information, i.e., IP address:/hash_value. In Step 1450, the current MDS updates the referral status table 0278, by adding an entry (if the entry does not exist) with the FSID, Client ID, and sets the status as "Normal." If YES in Step 1410, in Step 1460, the current MDS performs a path traversal to a local directory (local path 1120) found in the referral-to-path mapping table 0277 (Step 1410). In Step 1470, the current MDS serves the request with metadata of the local directory.

FIG. 15 shows an example of the structure of a referral status table 0278, which consists of, but is not limited to, 3 columns, including a FSID 1510, a ClientID 1520, and a status 1530. The FSID 1510 is a unique file system identifier. The ClientID 1520 is a unique ID assigned for a Client. The status 1530 is either "Normal" or "Migrated," which will be further described herein below.

FIG. 16 shows an example illustrating a file system namespace (referred to in FIG. 13) which is distributed to two MDSs 0110, i.e., MDS_1 (with IP address 192.168.1.10) and MDS_2 (with IP address 192.168.2.20). As in the example, "/dir1" is a referral directory created by MDS_1 and the real directory is stored in MDS_2, and "/dir1/dir2/dir3" is a referral directory created by MDS_2 and the real directory is stored in MDS_1. It should be noted that the location 0950 in an inode of a referral directory consists of a hash value instead of real path, such that cyclic path travel can be avoided. If the location 0950 in an inode of a referral directory stores the real path, following cyclic path travel will happen. For example, a Client 0130 wants to access "/dir1/dir2/dir3/f31," the client will first do the path travel from file system namespace root directory "/," which is stored in MDS_1, then will look up "/dir1." As "/dir1" is a referral directory, and suppose the inode consists of the real path (i.e., 192.168.2.20:/dir1) in MDS_2, the client then will look up "/dir1" under root directory in MDS_2, and will look up "dir2" and "dir3" in sequence. As "/dir1/dir2/dir3" is a referral directory again, and suppose the inode consists of the real path (i.e., 192.168.1.10:/dir1/dir2/dir3) in MDS_1, the client then will look up again "/dir1" under root directory in MDS_1 (this is required in order to look up "/dir1/dir2/dir3/f31 " in MDS_1). As "/dir1" is a referral directory, the client will jump back to MDS_2 again. As such, a cyclic path travel between MDS_1 and MDS_2 happens, and the client will never be able to access "/dir1/dir2/dir3/f31."

On the other hand, the aforementioned cyclic path travel can be avoided with the present invention. With the same example, a client wants to access "/dir1/dir2/dir3/f31," and will first do the path travel from file system namespace root directory "/," which is stored in MDS_1, and then will look up "/dir1." As "/dir1" is a referral directory, referring to "/0×20" in MDS_2, the client then will look up "/0×20" under root directory in MDS_2. As "/0×20" is in the referral-to-path mapping table 0277 (as described in FIG. 14), MDS_2 serves the request with the metadata of "/dir1." Again, the client then will look up "dir2" and "dir3" in sequence. Now, as "/dir1/dir2/dir3" is a referral directory again, referring to "/0×10" in MDS_1, the client then will look up "/0×10" under root directory in MDS_1. As "/0×10" is in the referral-to-path mapping table 0277, MDS_1 then serves the request with metadata of "/dir1/dir2/dir3" directly to the client. As a result, the client can then successfully access "f31" under the directory.

Figure 21:
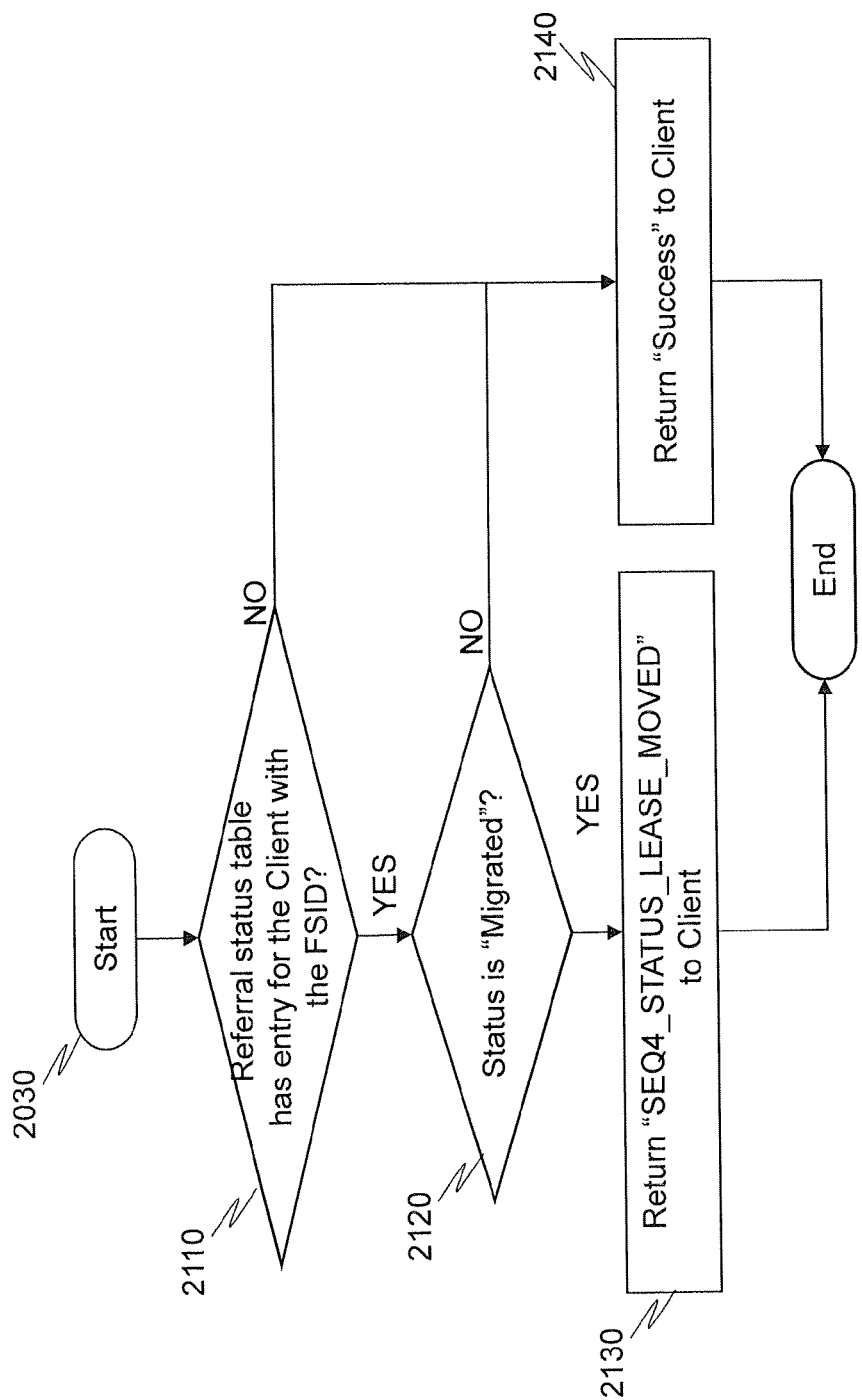
FIG. 21 is an example of a flow diagram illustrating the exemplary steps to inform clients of the new location of the referral directory.

Referring back to FIG. 7, in Step 0710, if the request is for others, in Step 0740, the current MDS then serves the request as conventional NFS protocol except SEQUENCE RPC call, which will be further explained in FIG. 21. In Step 0750, the current MDS updates its workload information table 027A.

Figure 17:
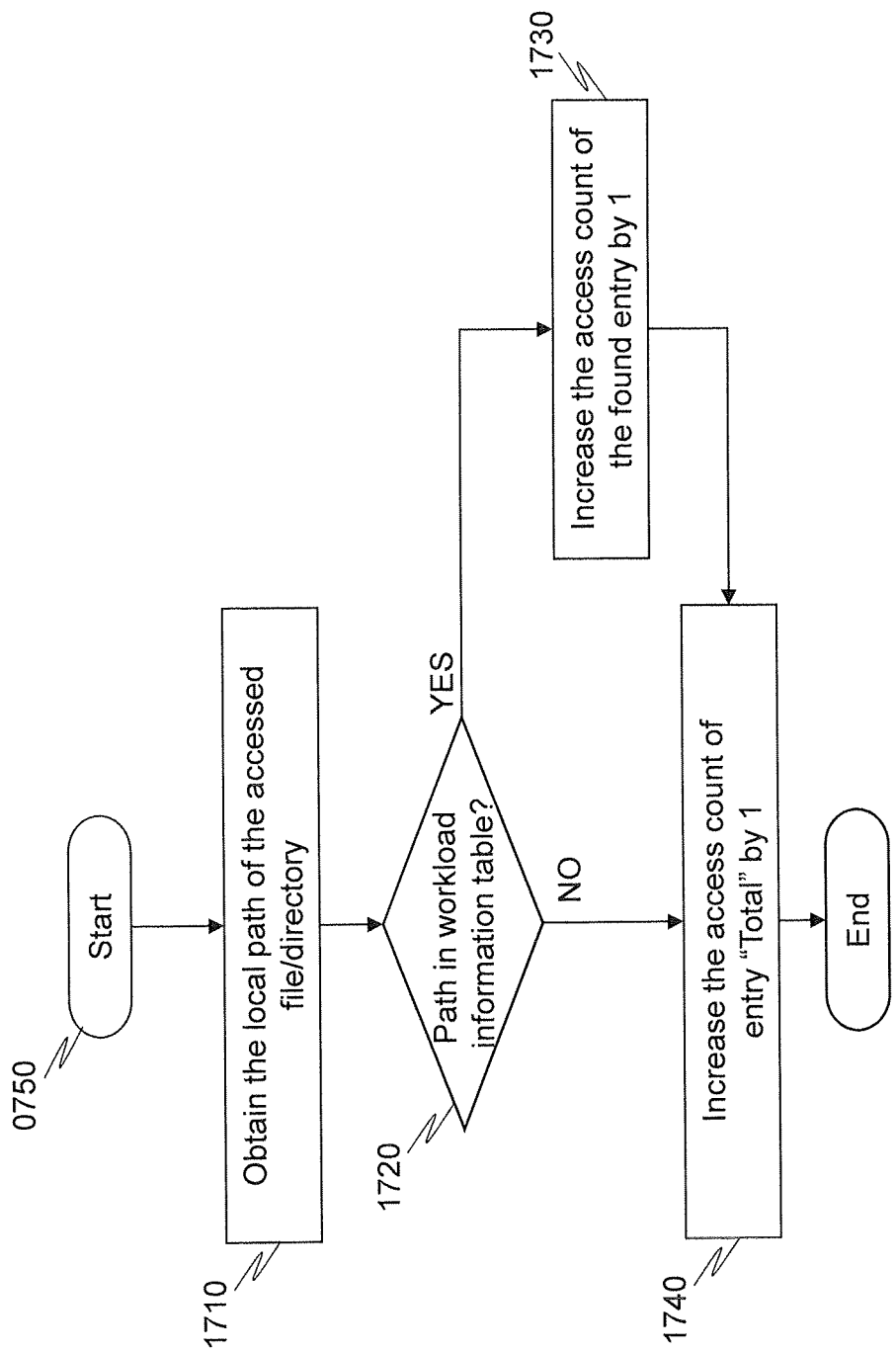
FIG. 17 is an example of a flow diagram illustrating the exemplary steps to update the workload information table.

FIG. 17 is an example of a flow diagram illustrating the exemplary steps constituting Step 0750 to update the workload information table in FIG. 7. In Step 1710, the current MDS obtains the local path of the accessed file/directory. In Step 1720, the current MDS checks if the path is in the workload information table 027A. The check process in Step 1720 is a recursive process. For example, if the accessed path is "/a/b/c," the current MDS will check if the workload information table 027A has an entry with local path as "/a/b/c," or "/a/b," or "/a" in sequence. If any of the paths is found in the workload information table 027A, the check process terminates and the current MDS increases the access count of the found entry by 1 (Step 1730), and the access count of the entry "Total" by 1 (Step 1740). Otherwise, the current MDS only increases the access count of the entry "Total" by 1 (Step 1740).

As described in FIG. 5 (Step 0530), the first MDS (periodically or when a new MDS 0110 registers) collects utilization information from all the MDSs, and broadcasts the consolidated utilization information to the other MDSs. Upon receiving the request to collect utilization information, a MDS 0110 executes a workload monitoring program 0274.

Figure 18:
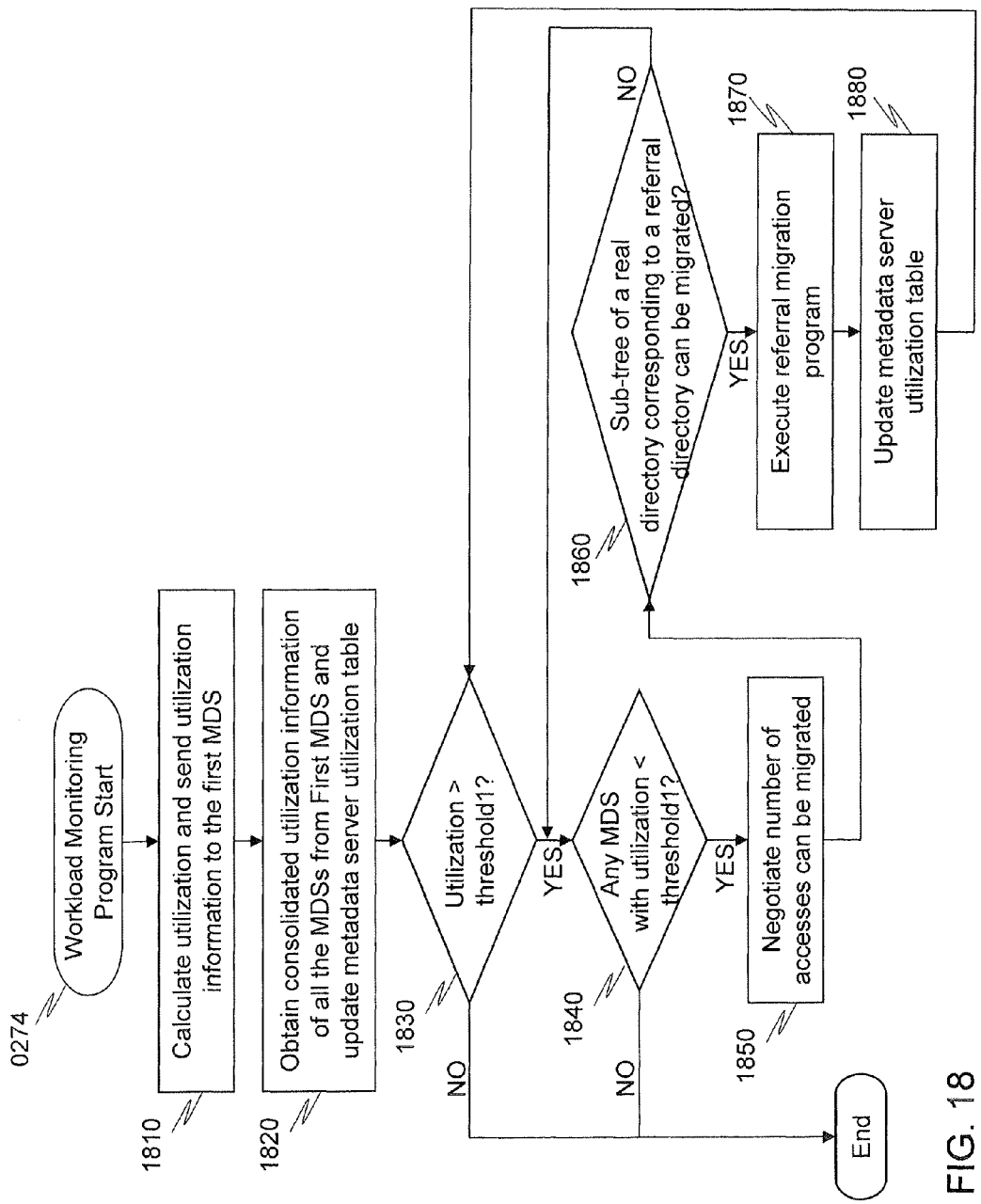
FIG. 18 is an example of a flow diagram illustrating the exemplary steps of a workload monitoring program according to the first embodiment.

FIG. 18 is an example of a flow diagram illustrating the exemplary steps of a workload monitoring program 0274 according to the first embodiment. In Step 1810, the current MDS first calculates its utilization 0620, which is a percentage number defined as the Total_access/Max_access, where Total_access is the access count 1220 of entry "Total" in the workload information table 027A, and Max_access means the maximum number of namespace accesses that can be served by the MDS 0110 within the time period since last execution time of the workload monitoring program 0274. The current MDS then sends the utilization information to the first MDS as a reply. In Step 1820, the current MDS obtains the consolidated utilization information of all the MDSs from the broadcast message from the first MDS and updates the metadata server utilization table 0279. In Step 1830, the current MDS checks if its utilization 0620 is higher than a predefined threshold, referred to as threshold1. The threshold1 may have any suitable value; in one example, threshold1 is 90%. If YES, in Step 1840, the current MDS further checks if there is any MDS (referred to as remote MDS) with utilization lower than threshold1. If YES, in Step 1850, the current MDS negotiates with the remote MDS on the number of accesses that can be migrated. The remote MDS then replies with the number of accesses that can be migrated, which is defined as Total_access*(threshold1-utilization)/utilization, where Total_access is the access count 1220 of entry "Total" in the workload information table 027A, and utilization is its utilization 0620 in the metadata server utilization table 0279. In Step 1860, the current MDS then checks if any sub-tree of a real directory corresponding to a referral directory can be migrated to the remote MDS, by checking if any entry (the entry "Total" is exclusive) in the workload information table 027A has an access count 1220 less than the number of accesses that can be migrated as determined in Step 1850. If YES, in Step 1870, the current MDS then executes a referral migration program 0276 to migrate the selected sub-tree to the remote MDS (which will be further described in FIG. 19). In Step 1880, the current MDS updates the metadata server utilization table 0279, by reducing the utilization 0620 of the current MDS and increasing the utilization 0620 of the remote MDS based on the access account 1220 of the migrated sub-tree. Recursively, the current MDS checks again if its utilization 0620 is higher than threshold1 in Step 1830. If NO in Step 1830 or Step 1840, the program ends.

It should be noted that during negotiation (in Step 1850), the number of accesses that can be migrated should be reserved in the remote MDS, so as to prevent multiple MDSs from migrating namespace sub-trees to the same remote MDS and overloading the remote MDS. Also, if no namespace sub-tree can be migrated to the remote MDS (in Step 1860), the reservation should be released so that other MDSs can migrate namespace sub-trees to the remote MDS.

Figure 19:
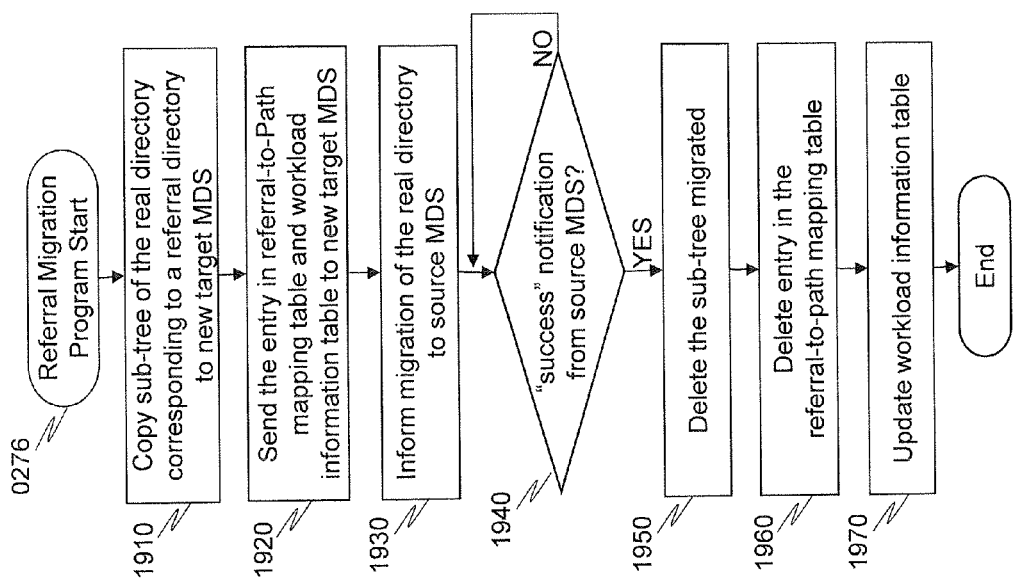
FIG. 19 is an example of a flow diagram illustrating the exemplary steps of a referral migration program.

FIG. 19 is an example of a flow diagram illustrating the exemplary steps of a referral migration program 0276. In Step 1910, the current MDS copies the sub-tree of the real directory corresponding to a referral directory to the remote MDS (referred to as new target MDS), by creating the same namespace of the sub-tree in the remote MDS. It should be noted that if the sub-tree consists of other real directories referring to from other referral directories, the sub-trees under the underneath real directories are excluded from the migration (i.e., they remain in the current MDS). Further, before the referral migration program 0276 completes, the MDS will forward the subsequent namespace update of the copied sub-tree to the new target MDS to ensure that the namespace of the sub-tree in both MDSs remains consistent. In Step 1920, the current MDS sends the corresponding entry of the real directory in the referral-to-path mapping table 0277, and the corresponding entry of the sub-tree of the real directory in the workload information table 027A, to the new target MDS. As a result, the new target MDS will insert the received entries into its referral-to-path mapping table 0277 and workload information table 027A, respectively. In Step 1930, the current MDS informs the source MDS (with the IP address 1130 in the corresponding entry in the referral-to-path mapping table 0277) about the migration of the real directory to the new target MDS. In Step 1940, the current MDS waits to receive "success" notification from the source MDS.

Figure 20:
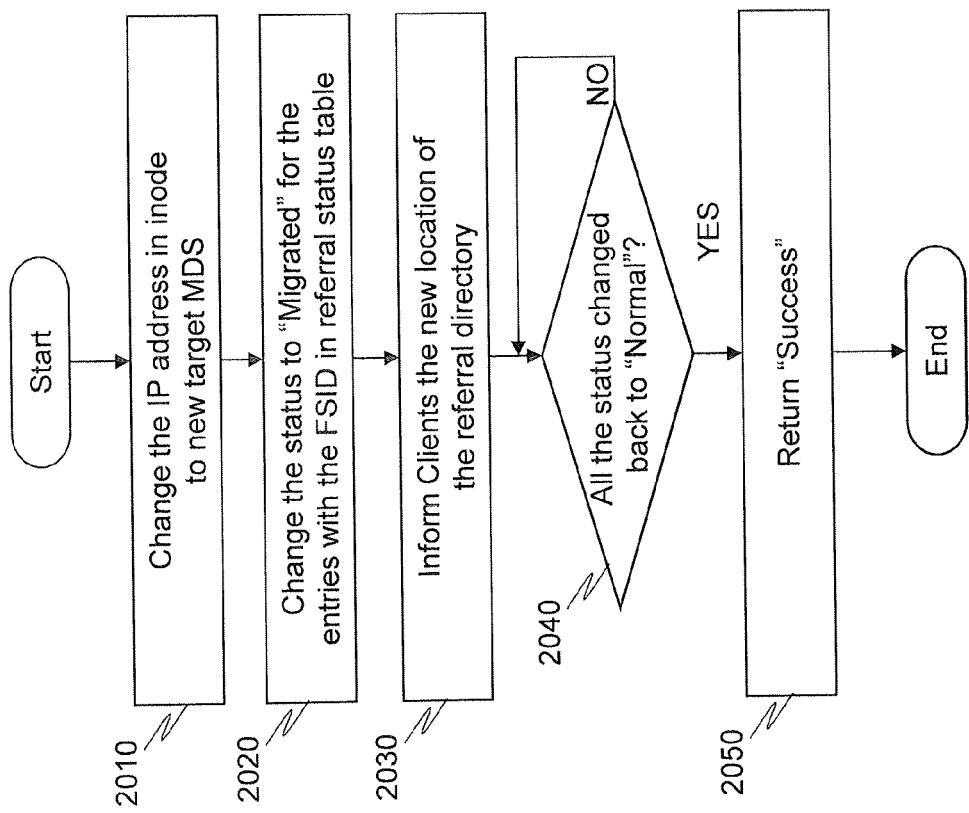
FIG. 20 is an example of a flow diagram illustrating the exemplary steps of the process executed in the source MDS upon receiving the message of a referral directory migration.

FIG. 20 is an example of a flow diagram illustrating the exemplary steps of the process executed in the source MDS upon receiving the message of the migration of a real directory corresponding to a referral directory (see Step 1930 in FIG. 19). In Step 2010, the source MDS changes the IP address of the location 0950 in the inode of the referral directory to the new target MDS's IP address. In Step 2020, the source MDS changes the status 1530 to "Migrated" for the entries in the referral status table 0278 with the FSID 0940 of the referral directory inode. In Step 2030, the source MDS then informs the Clients 0130 about the new location 0950 of the referral directory, through the reply of the SEQUENCE RPC call from a Client. In Step 2040, the source MDS waits until all the status 1530 that were changed to "Migrated" in Step 2020 are changed back to "Normal," and in Step 2050, the source MDS replies with "success."

FIG. 21 is an example of a flow diagram illustrating the exemplary steps constituting Step 2030 in FIG. 20 to inform clients of the new location of the referral directory, when receiving SEQUENCE RPC call (which is the first RPC call followed by other RPC calls in each request sent from a client, and is used for established session control) from a Client 0130. In Step 2110, the source MDS checks if the referral status table 0278 has an entry with the FSID 1510 as the migrated directory entry and the ClientID 1520 for the Client. If NO, in Step 2140, the source MDS returns "success." Otherwise, in Step 2120, the source MDS further checks if the status 1530 of the found entry is "Migrated." If YES, the source MDS returns "SEQ4_STATUS_LEASE_MOVED" (which indicates that responsibility for lease renewal for a mounted file system, i.e., a referral directory, has been transferred to a new metadata server) to the client. Consequently, the client will read the referral directory to get the new location as described in FIG. 14, and the status 1530 of the corresponding entry will be changed back to "Normal" (Step 1450). If NO in Step 2120, the source MDS returns "success."

Referring back to FIG. 19, after receiving the "success" notification from the source MDS, in Step 1950, the current MDS deletes the migrated sub-tree of the real directory corresponding to a referral directory. It should be noted that if the sub-tree consists of other real directories referred to from other referral directories, the path to the underneath real directories will remain. In Step 1960, the current MDS deletes the entry of the migrated real directory from the referral-to-path mapping table 0277. In Step 1970, the current MDS updates the workload information table 027A, by removing the entry of the migrated sub-tree, and decreasing the access count 1220 of the entry "Total" by the access count 1220 of the migrated sub-tree.

It should be noted that when workload monitoring program 0274 completes its process, a MDS will reset all the access counts 1220 to "0" in the workload information table 027A, in order to monitor access workload within the time period between current and the next execution time of the workload monitoring program 0274.

Embodiment 2

The description of a second embodiment of the present invention will mainly focus on the differences from the first embodiment. In the first embodiment, when creating a directory, a MDS 0110 checks if it is the MDS with lowest utilization (see Step 0810 in FIG. 8). If NO, the directory will be created as a referral directory and distributed to a remote MDS. As a result, sub-directories under a parent directory may be widely distributed to all the MDSs. This may cause low directory access performance (e.g., readdir) and high memory usage at the Client 0130, as a client needs to establish additional connection with a remote MDS and create a super block for each referral directory.

In the second embodiment, referral directories are created and distributed to a number of MDSs, based on the depth and width of the parent directory, to reduce the number of referral directories created, and control the number of MDSs to which the referral directories are distributed. To this end, for directories that are closer to root, its sub-directories will be more widely distributed. As such directories are typically created for different purposes, e.g., different departments, different projects, different users, and so on, it is better to distribute such directories to more MDSs to share the workload. In addition, a fat directory with many sub-files/directories may have lots of access from clients, and therefore, it is also better to distribute the sub-directories to more MDSs to share the workload. On the other hand, a thin and deep directory can be split into multiple portions, and each portion is stored in a MDS, to avoid the situation where a single MDS handles all the metadata access to the entire sub-tree.

Figure 22:
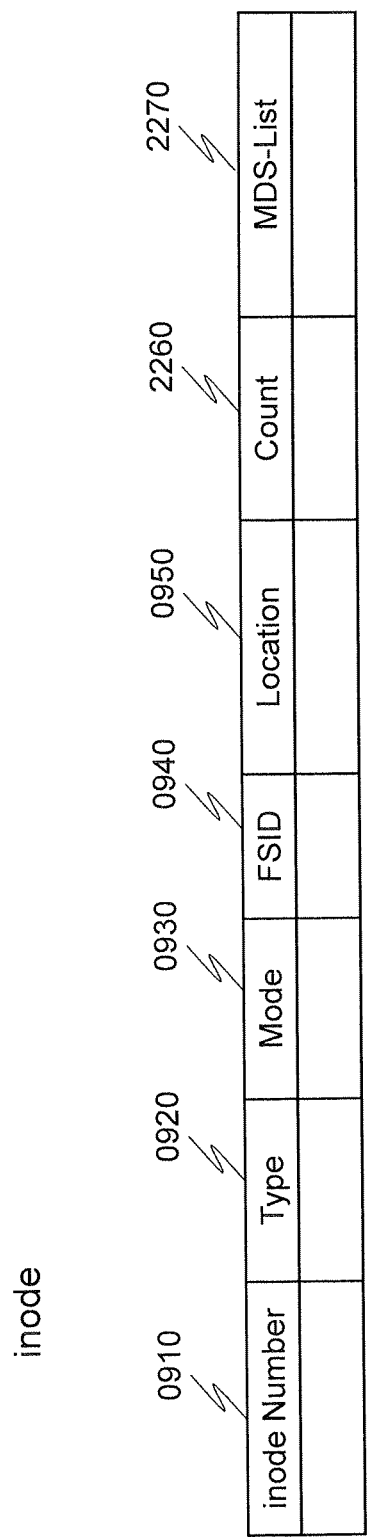
FIG. 22 shows an example of the structure of an inode according to the second embodiment.

FIG. 22 shows an example of the structure of an inode, according to the second embodiment, where a count 2260 and a MDS-List 2270 are added (see the first embodiment in FIG. 9). The count 2260 is the number of MDSs 0110 to which the sub-directories can be distributed, and is initially set to 1. The MDS-List 2270 is a list of IP addresses of MDSs to which the sub-directories can be distributed, and is initially consisted of only the IP address of the MDS where the directory is created.

Figure 23:
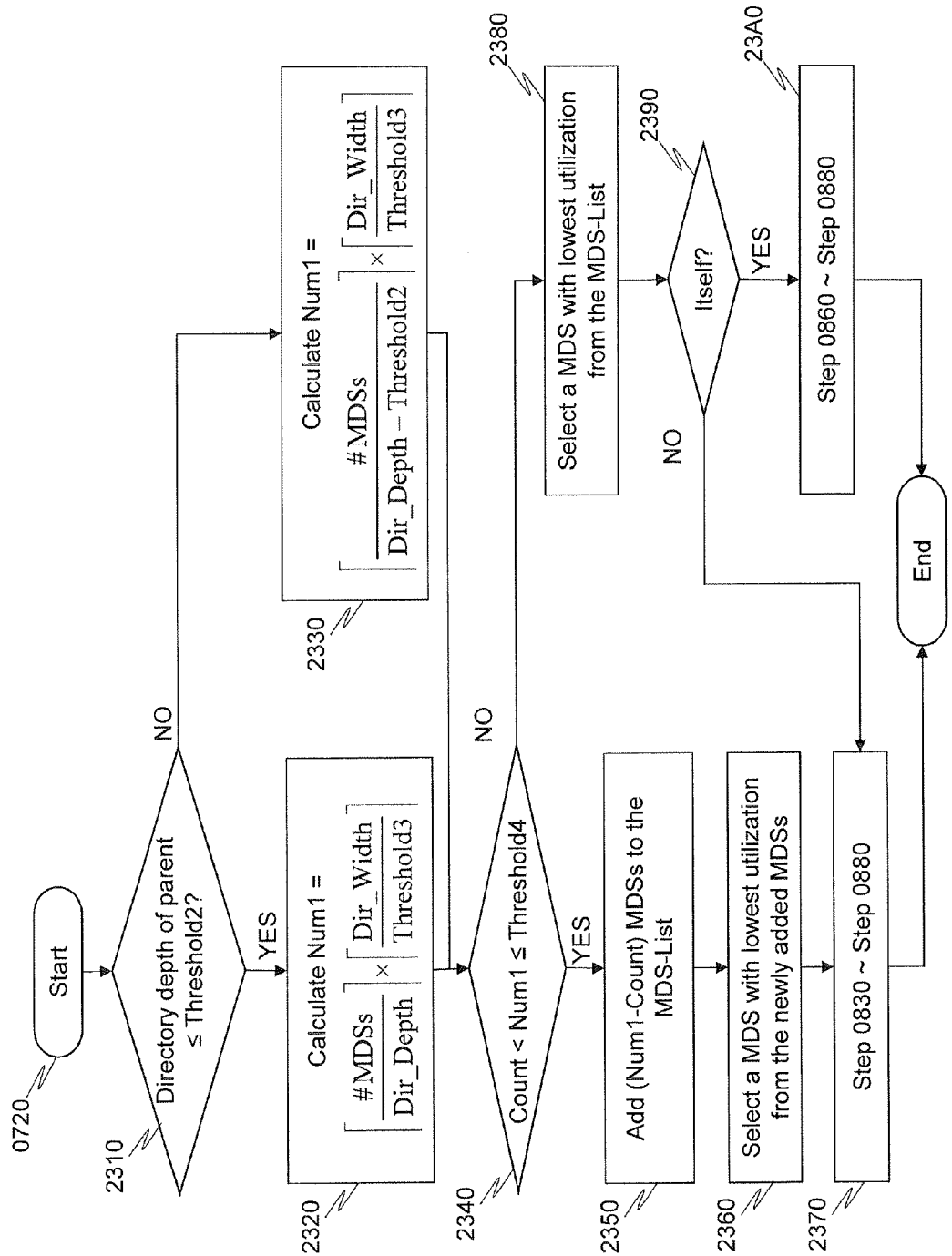
FIG. 23 is an example of a flow diagram illustrating the exemplary steps of the create-directory process according to the second embodiment.

FIG. 23 is an example of a flow diagram illustrating the exemplary steps of the create-directory process (Step 0720 in FIG. 7) according to the second embodiment. In Step 2310, the current MDS 0110 checks if the directory depth of the parent directory is smaller than or equal to a predefined threshold, referred to as Threshold2. Threshold2 may have any suitable value; in one example, Threshold2 is 10. The depth of a directory (referred to as Dir_Depth) is defined as the depth from the root of the file system namespace to the directory, or from the top of a sub-tree of a referral directory to the directory (if the directory is in the sub-tree of a referral directory). If YES, in Step 2320, the current MDS calculates the number of MDSs (referred to as Num1), to which the sub-directories under the parent directory can be distributed, as ⌈#MDSs/Dir_Depth⌉×⌈Dir_Width/Threshold3⌉, where #MDSs is the total number of MDSs in the system, Dir_Depth is the directory depth of the parent directory as defined above, Dir_Width is the number of sub-files/sub-directories under the parent directory, and Threshold3 is a predefined threshold. Threshold3 may have any suitable value; in one example, Threshold3 is 1000. If NO in Step 2310, in Step 2330, the current MDS then calculates the Num1 as ⌈#MDSs/(Dir_Depth-Threshold2)⌉×⌈Dir_Width/Threshold3⌉. In Step 2340, the current MDS checks if count 2260 in the parent inode is smaller than Num1, and Num1 is smaller than or equal to a predefined threshold, referred to as Threshold4, which represents the maximal number of MDSs to which the sub-directories can be distributed. Threshold4 may have any suitable value; in one example, Threshold4 is 10. If YES, in Step 2350, the current MDS adds (Num1-count) MDSs to the MDS-List 2270 of the parent directory inode. In Step 2360, the current MDS selects a MDS with the lowest utilization from the newly added MDSs, and executes Step 2370, which consists of the same steps from Step 0830 to Step 0880, as described in FIG. 8. If NO in Step 2340, the current MDS selects a MDS with the lowest utilization from the MDS-List 2270. In Step 2390, the current MDS checks if the selected MDS is itself. If NO, the current MDS executes Step 2370. Otherwise, the current MDS executes Step 23A0, which consists of the same steps from Step 0860 to Step 0880, as described in FIG. 8.

Figure 24:
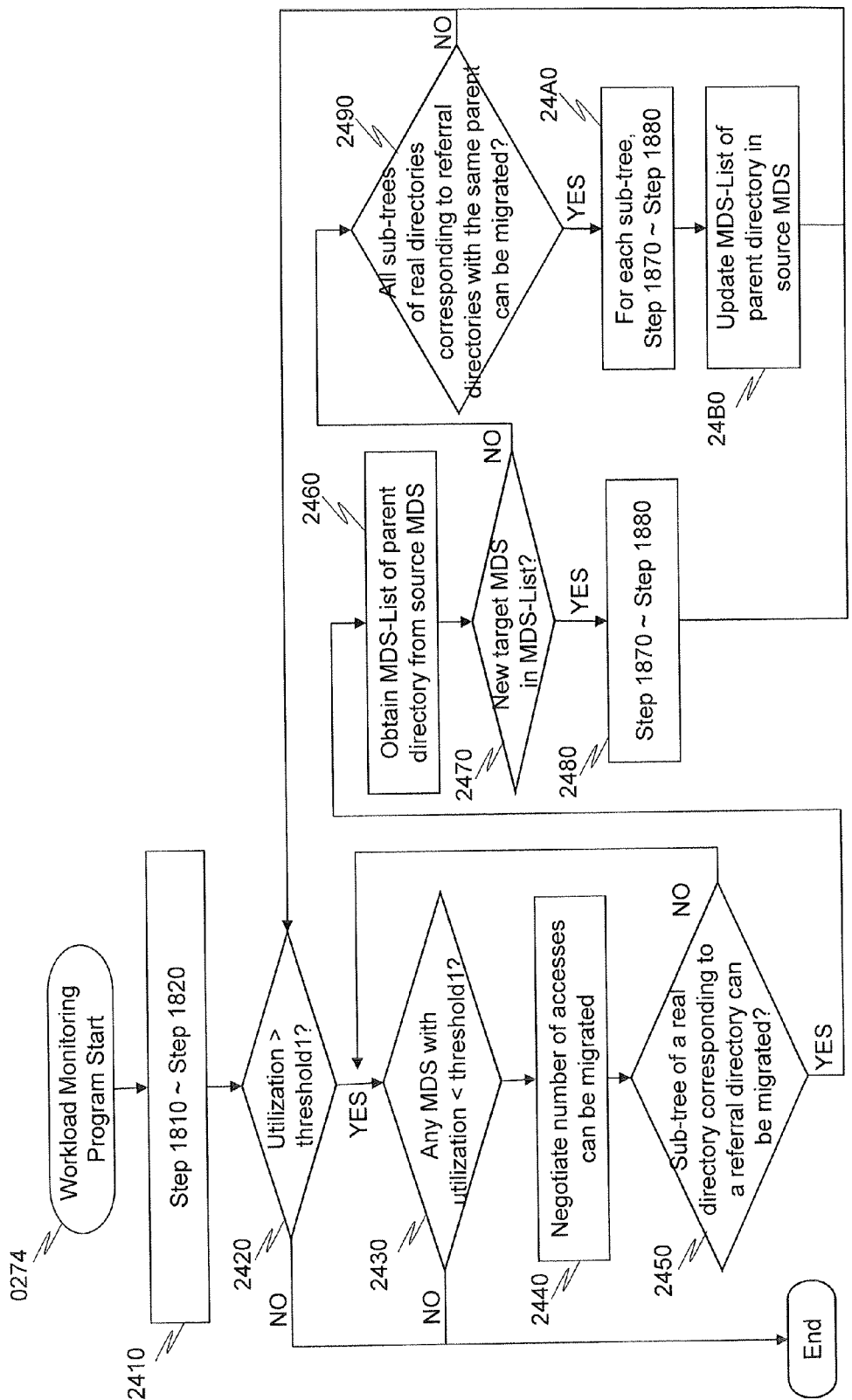
FIG. 24 is an example of a flow diagram illustrating the exemplary steps of a workload monitoring program according to the second embodiment.

FIG. 24 is an example of a flow diagram illustrating the exemplary steps of a workload monitoring program 0274 according to the second embodiment. In Step 2410, the current MDS executes the same Step 1810 and Step 1820, as described in FIG. 18. In Step 2420, the current MDS checks if its utilization 0620 is higher than threshold1. If YES, in Step 1840, the current MDS further checks if there is any MDS (referred to as remote MDS) with utilization lower than threshold1. If YES, in Step 2440 (same as Step 1850), the current MDS negotiates with the remote MDS on the number of accesses that can be migrated. In Step 2450, the current MDS then checks if any sub-tree of a real directory corresponding to a referral directory can be migrated to the remote MDS, by checking if any entry (the entry "Total" is exclusive) in the workload information table 027A has an access count 1220 less than the number of accesses that can be migrated as determined in Step 2440. If YES, in Step 2460, the current MDS then obtains the MDS-List 2270 of the parent directory from the source MDS, with the IP address 1130 of the corresponding entry in the referral-to-path mapping table 0277. In Step 2470, the current MDS checks if the remote MDS (referred to new target MDS) is in the MDS-List. If YES, the current MDS then executes Step 2480, which consists of Step 1870 and Step 1880, as described in FIG. 18. If NO, in Step 2490, the current MDS checks if all sub-trees of real directories corresponding to referral directories with the same parent directory can be migrated the new target MDS, by checking the total access account 1220 of the sub-trees in the workload information table 027A. If YES, in Step 24A0, for each sub-tree, the current MDS executes Step 1870 and Step 1880. In Step 24B0, the current MDS updates the MDS-List 2270 in the source MDS, by removing the IP address of the current MDS and adding the IP address of the new target MDS. Recursively, the current MDS checks again if its utilization 0620 is higher than threshold1 in Step 2420, after Step 2480 or Step 24B0 or if NO in Step 2490. If NO in Step 2420 or Step 2430, the program ends.

Embodiment 3

The description of a third embodiment of the present invention will mainly focus on the differences from the first embodiment. In the first embodiment, clients 0130 first access the metadata from MDSs 0110 and then access file contents directly from DSs 0120. In other words, MDSs 0110 are not in the access path during file contents access. However, a Client 0130 may not have the capability to differentiate between the processes of metadata access and file contents access, i.e., to send metadata access to MDSs and send file content access to DSs. Instead, a Client 0130 may send both metadata access and file contents access to MDSs 0110. Therefore, in the third embodiment, the MDSs 0110 will serve both metadata access and file content access from Clients 0130.

Figure 25:
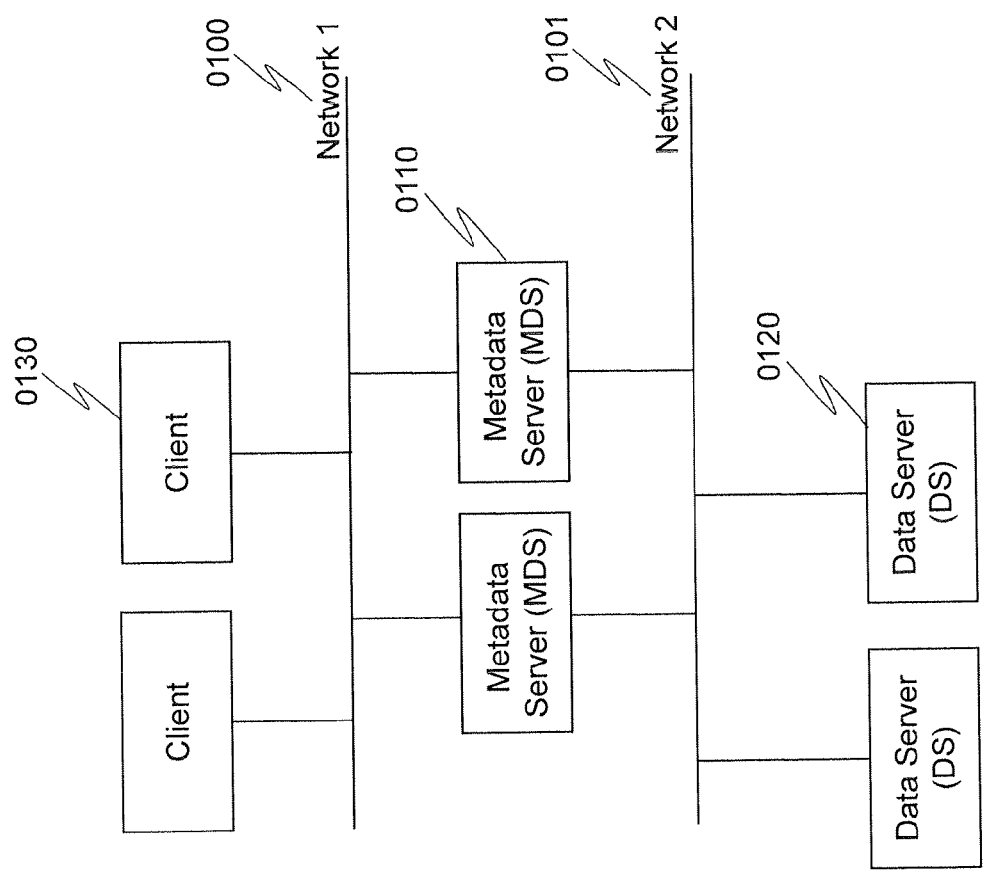
FIG. 25 is an exemplary diagram of an overall system according to the third embodiment.

FIG. 25 is an exemplary diagram of an overall system according to the third embodiment. The system includes a plurality of Metadata Servers (MDSs) 0110, Data Servers (DSs) 0120, and Clients 0130. Clients 0130 and MDSs 0110 are connected to a network 1 0100. MDSs 0110 and DSs 0120 are connected to a network 2 0101. Clients 0130 access both the metadata and file contents from MDSs 0110 through network 1 0100. For metadata access, MDSs will serve the requests as described in the first embodiment. For file contents access, if the access involves read operation, the MDSs 0110 will retrieve file contents from DSs 0120 through network 2 0101, and send back file contents to Clients 0130 through network 1 0100. On the other hand, if the access involves write operation, the MDSs 0110 will receive the file contents from Clients 0130 through network 1 0100, and store the file contents to DSs 0120 through network 2 0101.

Embodiment 4

The description of a fourth embodiment of the present invention will mainly focus on the differences from the above embodiments 1-3. In the above-described embodiments, a MDS 0110 maintains location information of file contents 0252, and a Client 0130 uses the location information to access file contents 0332 stored in DSs 0120 through NFS protocol module 0420. In the fourth embodiment, a MDS 0110, a DS 0120, and a Client 0130 can also be equipped with a block-access protocol module, such as iSCSI (Internet Small Computer System Interface) and FCOE (Fibre Channel over Ethernet). A MDS 0110 can store location information of file contents in such a way that a Client 0130 can access file contents via either NFS protocol module or block-access protocol module.

Of course, the system configurations illustrated in FIGS. 1 and 25 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for a directory-level referral process for parallel network file system with multiple metadata servers. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A plurality of MDSs (metadata servers) in a distributed storage system which includes data servers storing file contents, each MDS: having a processor and a memory and storing file system metadata,
    wherein directories of a file system namespace are distributed to the MDSs through referral directories referring to real directories using hash value of inode number of each of the referral directories;
    wherein during a process to create a directory in the file system namespace, a first MDS dynamically creates a referral directory in the first MDS, and creates a real directory in a second MDS, the referral directory in the first MDS referring to the real directory in the second MDS by maintaining location information of the real directory in the second MDS, the real directory in the second MDS containing the file system metadata for the directory in the file system namespace;
    wherein each directory in the MDSs has an inode, the inode including an inode number, a mode of "referral" for a referral directory and "normal" for a directory which is not a referral directory, a file system identifier, and a location entry;
    wherein the file system identifier uniquely identifies the referral directory if the mode is referral;
    wherein the location entry has an IP address of the MDS in which the real directory is located and a hash value of the inode number if the mode is referral;
    wherein the inode of a directory further includes a count which is a number of MDSs to at least some of which sub-directories of the directory are to be distributed, and a MDS-List which is a list of IP addresses of MDSs to at least some of which the sub-directories are to be distributed; and
    wherein the count and MDS-List are determined based on depth and width of the directory.

2. The plurality of MDSs according to claim 1,
    wherein the location information of the referral directory includes a hash value for the real directory and an IP address of the second MDS; and
    wherein the second MDS maps the hash value for the real directory to a local directory path in a local namespace of the second MDS to the real directory.

3. The plurality of MDSs according to claim 1,
    wherein the first MDS has a parent directory and creates the referral directory under the parent directory to refer to the real directory in the second MDS.

4. The plurality of MDSs according to claim 3,
    wherein the first MDS constructs an inode for the referral directory which refers to the real directory, the inode for the referral directory including an inode number, a file system identifier, and a location entry which has an IP address of the second MDS in which the real directory is located and a hash value of the inode number.

5. The plurality of MDSs according to claim 1,
    wherein each MDS includes a referral-to-path mapping table to store entries of a hash value of any real directory in the MDS, a corresponding local path where the real directory is stored in a local namespace of the MDS, and a corresponding IP address of a source MDS where the referral directory referring to the real directory is located.

6. The plurality of MDSs according to claim 5,
    wherein each MDS maintains workload information to monitor access workload for each directory in the referral-to-path mapping table of the MDS.

7. The plurality of MDSs according to claim 1,
    wherein the first MDS in the distributed storage system periodically collects utilization information from one or more of other MDSs and broadcasts consolidated utilization information to all the other MDSs.

8. The plurality of MDSs according to claim 1,
    wherein any MDS, which has a real directory being referred to from a referral directory and has utilization higher than a preset threshold, migrates the real directory including sub-tree of the real directory to another MDS which has utilization sufficiently low to receive migration of the real directory with the sub-tree, and informs a source MDS where the referral directory referring to the real directory is located of the updated location information.

9. The plurality of MDSs according to claim 8,
    wherein each MDS includes a referral-to-path mapping table to store entries of a hash value of any real directory in the MDS, a corresponding local path where the real directory is stored in a local namespace of the MDS, and a corresponding IP address of a source MDS where the referral directory referring to the real directory is located; and
    wherein, after migration of a real directory from one MDS to another MDS, the one MDS and said another MDS update respective referral-to-path mapping tables and update respective workload information for the respective MDSs based on the migration.

10. The plurality of MDSs according to claim 8,
    wherein if the sub-tree of the real directory to be migrated includes another real directory being referred to from another referral directory, the said another real directory is not migrated but remains in the same MDS before migration of the sub-tree.

11. The plurality of MDSs according to claim 1,
    wherein the inode in each directory in the MDSs has a unique inode number.

12. The plurality of MDSs according to claim 1,
    wherein each directory is assigned a unique inode number.

13. A method of managing directories in a distributed storage system which includes a plurality of MDSs (metadata servers) storing file system metadata and data servers storing file contents, the method comprising:
    distributing directories of a file system namespace to the MDSs through referral directories referring to real directories using hash value of inode number of each of the referral directories;
    wherein during a process to create a directory in the file system namespace, a first MDS dynamically creates a referral directory in the first MDS, and creates a real directory in a second MDS, the referral directory in the first MDS referring to the real directory in the second MDS by maintaining location information of the real directory in the second MDS, the real directory in the second MDS containing the file system metadata for the directory in the file system namespace;

wherein each directory in the MDSs has an inode, the inode including an inode number, a mode of "referral" for a referral directory and "normal" for a directory which is not a referral directory, a file system identifier, and a location entry;

wherein the file system identifier uniquely identifies the referral directory if the mode is referral;

wherein the location entry has an IP address of the MDS in which the real directory is located and a hash value of the inode number if the mode is referral;

wherein the inode of a directory further includes a count which is a number of MDSs to at least some of which sub-directories of the directory are to be distributed, and a MDS-List which is a list of IP addresses of MDSs to at least some of which the sub-directories are to be distributed; and wherein the count and MDS-List are determined based on depth and width of the directory.

14. The method according to claim 13, wherein the location information of the referral directory includes a hash value for the real directory and an IP address of the second MDS, the method further comprising:
mapping, by the second MDS, the hash value for the real directory to a local directory path in a local namespace of the second MDS to the real directory.

15. The method according to claim 13, wherein the first MDS has a parent directory and creates the referral directory under the parent directory to refer to the real directory in the second MDS, the method further comprising:
constructing, by the first MDS, an inode for the referral directory which refers to the real directory, the inode for the referral directory including an inode number, a file system identifier, and a location entry which has an IP address of the second MDS in which the real directory is located and a hash value of the inode number.

16. The method according to claim 13, wherein each MDS includes a referral-to-path mapping table to store entries of a hash value of any real directory in the MDS, a corresponding local path where the real directory is stored in a local namespace of the MDS, and a corresponding IP address of a source MDS where the referral directory referring to the real directory is located, the method further comprising:
maintaining, by each MDS, workload information to monitor access workload for each directory in the referral-to-path mapping table of the MDS.

17. The method according to claim 13, further comprising:
periodically collecting, by the first MDS in the distributed storage system, utilization information from one or more of other MDSs, and broadcasting consolidated utilization information to all the other MDSs.

18. The method according to claim 13, further comprising:
migrating, by any MDS which has a real directory being referred to from a referral directory and has utilization higher than a preset threshold, the real directory including sub-tree of the real directory to another MDS which has utilization sufficiently low to receive migration of the real directory with the sub-tree, and informing a source MDS where the referral directory referring to the real directory is located of the updated location information.

19. The method according to claim 13,
wherein the inode in each directory in the MDSs has a unique inode number.

20. The method according to claim 13, wherein each directory is assigned a unique inode number.

* * * * *